United States Patent
Sauvageau et al.

(10) Patent No.: US 11,814,118 B2
(45) Date of Patent: Nov. 14, 2023

(54) SUSPENDED UNDERCARRIAGE ASSEMBLY FOR A TRACK SYSTEM

(71) Applicant: SOUCY INTERNATIONAL INC., Drummondville (CA)

(72) Inventors: Yves Sauvageau, Drummondville (CA); Branislav Nanac, Drummondville (CA); David Barry, Longueuil (CA); Styve Allie, Drummondville (CA); Charles St-Arnaud, Trois-Rivières (CA); Michel Pellerin, Drummondville (CA); Steeve Pare, St-Majorique (CA); Marc-Andre Patry, Drummondville (CA); Gabriel Chantal, Saint-Pie (CA); Maxime Rivard, Blainville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 0 days.

(21) Appl. No.: 17/791,734

(22) PCT Filed: Jan. 22, 2021

(86) PCT No.: PCT/IB2021/050507
§ 371 (c)(1),
(2) Date: Jul. 8, 2022

(87) PCT Pub. No.: WO2021/149008
PCT Pub. Date: Jul. 29, 2021

(65) Prior Publication Data
US 2023/0038710 A1 Feb. 9, 2023

Related U.S. Application Data

(60) Provisional application No. 62/964,954, filed on Jan. 23, 2020.

(51) Int. Cl.
*B62D 55/108* (2006.01)
*B62D 55/084* (2006.01)
*B62D 55/10* (2006.01)

(52) U.S. Cl.
CPC ....... *B62D 55/1086* (2013.01); *B62D 55/084* (2013.01); *B62D 55/10* (2013.01)

(58) Field of Classification Search
CPC .. B62D 55/1086; B62D 55/084; B62D 55/10; B62D 55/104; B62D 55/108; B62D 55/1083; B62D 55/15
(Continued)

(56) References Cited

U.S. PATENT DOCUMENTS 2,333,107 A 11/1943 Knox
2,860,715 A 11/1958 Mecatec
(Continued)

FOREIGN PATENT DOCUMENTS

EP 2060416 B1 10/2013
JP 200882417 A 4/2008
(Continued)

OTHER PUBLICATIONS

International search Report from PCT/IB2021/050504, Shane Thomas, dated May 18, 2021.
(Continued)

*Primary Examiner* — Anne Marie M Boehler
(74) *Attorney, Agent, or Firm* — BCF LLP

(57) ABSTRACT

A suspended undercarriage assembly connectable to a multi-member frame assembly of a track system includes a beam having a leading portion and a trailing portion, at least one support wheel assembly connectable to the beam, at least one of a leading resilient bushing assembly and a trailing resilient bushing assembly including a bushing having an opening defined therein and being shaped and dimensioned
(Continued)

for promoting deformation of the bushing in at least one of a vertical direction and a lateral direction. The bushing is resiliently deformable to permit movement of the beam relative to the multi-member frame assembly in the vertical direction and in the lateral direction, and to resiliently bias the beam towards a rest position with respect to the multi-member frame assembly. A track system having the suspended undercarriage assembly is also provided.

13 Claims, 24 Drawing Sheets

(58) Field of Classification Search
USPC ....... 305/130, 131, 141, 142; 180/9.54, 9.58
See application file for complete search history.

(56) References Cited

U.S. PATENT DOCUMENTS

| | | | |
|---|---|---|---|
| 3,168,929 A | 2/1965 | Wardle | |
| 3,323,811 A | 6/1967 | Elson | |
| 3,706,481 A | 12/1972 | Kramer | |
| 3,841,424 A | 10/1974 | Purcell | |
| 3,913,987 A * | 10/1975 | Baldwin | B62D 55/108 305/132 |
| 4,193,612 A | 3/1980 | Masser | |
| 4,202,564 A | 5/1980 | Strader | |
| 4,351,572 A | 9/1982 | Fujiware | |
| 4,361,363 A | 11/1982 | Livesay | |
| 4,519,654 A | 5/1985 | Satzler | |
| 4,582,367 A * | 4/1986 | Jacquet | B62D 55/30 305/109 |
| 5,183,287 A | 2/1993 | VanSweden | |
| 5,749,423 A | 5/1998 | Burckhartzmeyer | |
| 5,829,848 A | 11/1998 | Kelderman | |
| 5,899,543 A | 5/1999 | Lykken et al. | |
| 5,954,148 A | 9/1999 | Okumura et al. | |
| 6,234,590 B1 | 5/2001 | Satzler | |
| 6,286,857 B1 | 9/2001 | Reese | |
| 6,712,549 B2 | 3/2004 | Roth | |
| 6,951,260 B1 | 10/2005 | Isley | |
| 7,533,741 B2 | 5/2009 | Brazier | |
| 8,118,374 B2 | 2/2012 | Canossa | |
| 8,573,336 B2 | 11/2013 | Arulraja et al. | |
| 8,794,358 B2 | 8/2014 | Hansen | |
| 9,452,796 B2 * | 9/2016 | Franck | B62D 55/14 |
| 9,828,047 B2 | 11/2017 | Eavenson, Sr. et al. | |
| 11,299,220 B2 * | 4/2022 | Sauvageau | B62D 55/24 |
| 2007/0029871 A1 | 2/2007 | Wake et al. | |
| 2010/0244554 A1 | 9/2010 | Yoshida et al. | |
| 2014/0138169 A1 | 5/2014 | Fairhead | |
| 2015/0217816 A1 | 8/2015 | Franck et al. | |
| 2015/0274355 A1 | 10/2015 | Grissom | |
| 2015/0321711 A1 * | 11/2015 | Vik | B62D 55/15 29/525.08 |
| 2017/0166270 A1 | 6/2017 | Sewell | |
| 2017/0225726 A1 * | 8/2017 | Johnson | B62D 55/116 |
| 2017/0225727 A1 | 8/2017 | Sauvageau et al. | |
| 2017/0274946 A1 * | 9/2017 | Vik | B62D 55/15 |
| 2018/0022407 A1 | 1/2018 | Lussier et al. | |
| 2018/0237084 A1 | 8/2018 | Nam et al. | |
| 2019/0118879 A1 | 4/2019 | Gustafson | |
| 2019/0359268 A1 | 11/2019 | Hellholm et al. | |
| 2019/0359926 A1 | 11/2019 | Scaglione et al. | |
| 2022/0089232 A1 * | 3/2022 | Aubin-Marchand | B62D 55/1086 |

FOREIGN PATENT DOCUMENTS

| | | |
|---|---|---|
| JP | 2020157911 A | 10/2020 |
| WO | 0160683 A1 | 8/2001 |
| WO | 201912453 A3 | 2/2019 |
| WO | 2019078119 A1 | 4/2019 |

OTHER PUBLICATIONS

International search Report from PCT/IB2021/050506, Shane Thomas, dated Jul. 22, 2021.
International search Report from PCT/IB2021/050506, Blaine Ré Copenheaver, dated May 25, 2021.
English abstract for WO2019078119 retrieved from Espacenet on Jun. 1, 2021.
English abstract of JP200882417 retrieved from Espacenet on Feb. 9, 2023.
English abstract of JP2020157911 retrieved from Espacenet on Feb. 9, 2023.

* cited by examiner

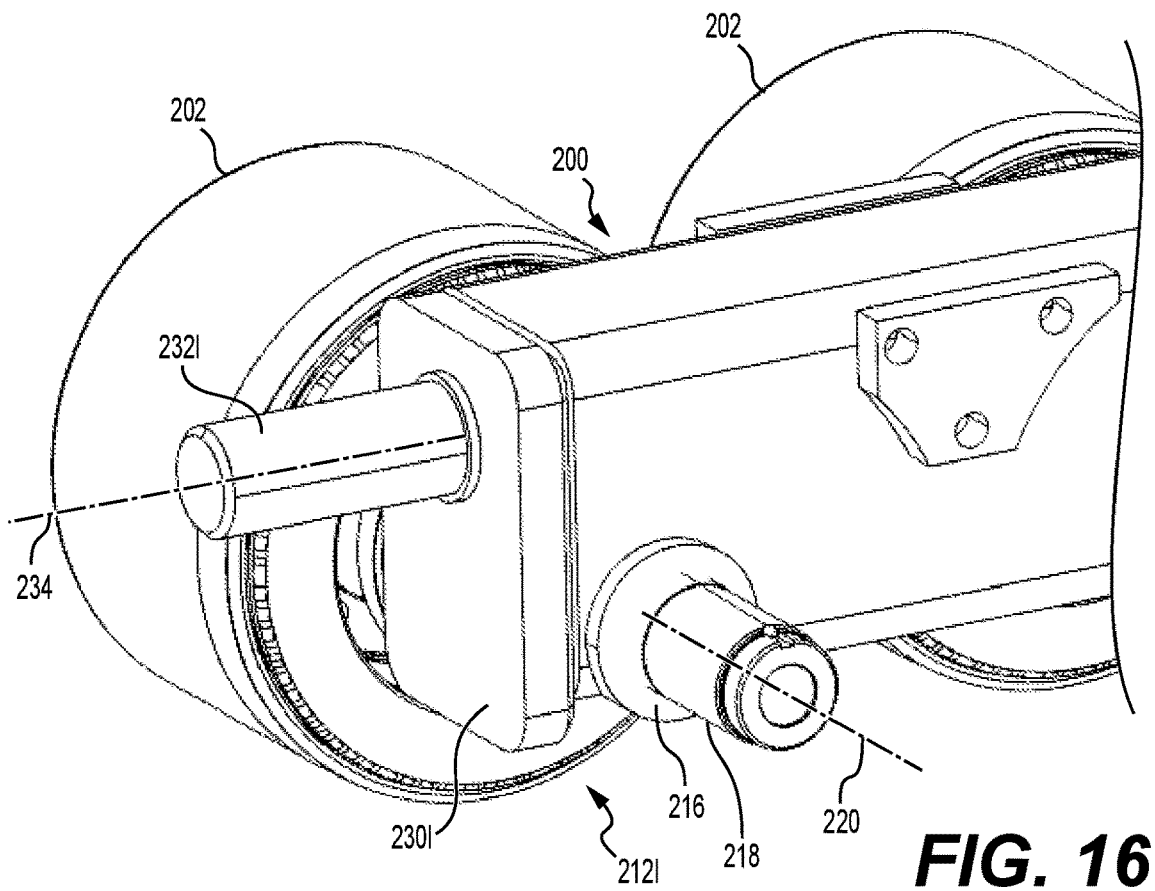
FIG. 16
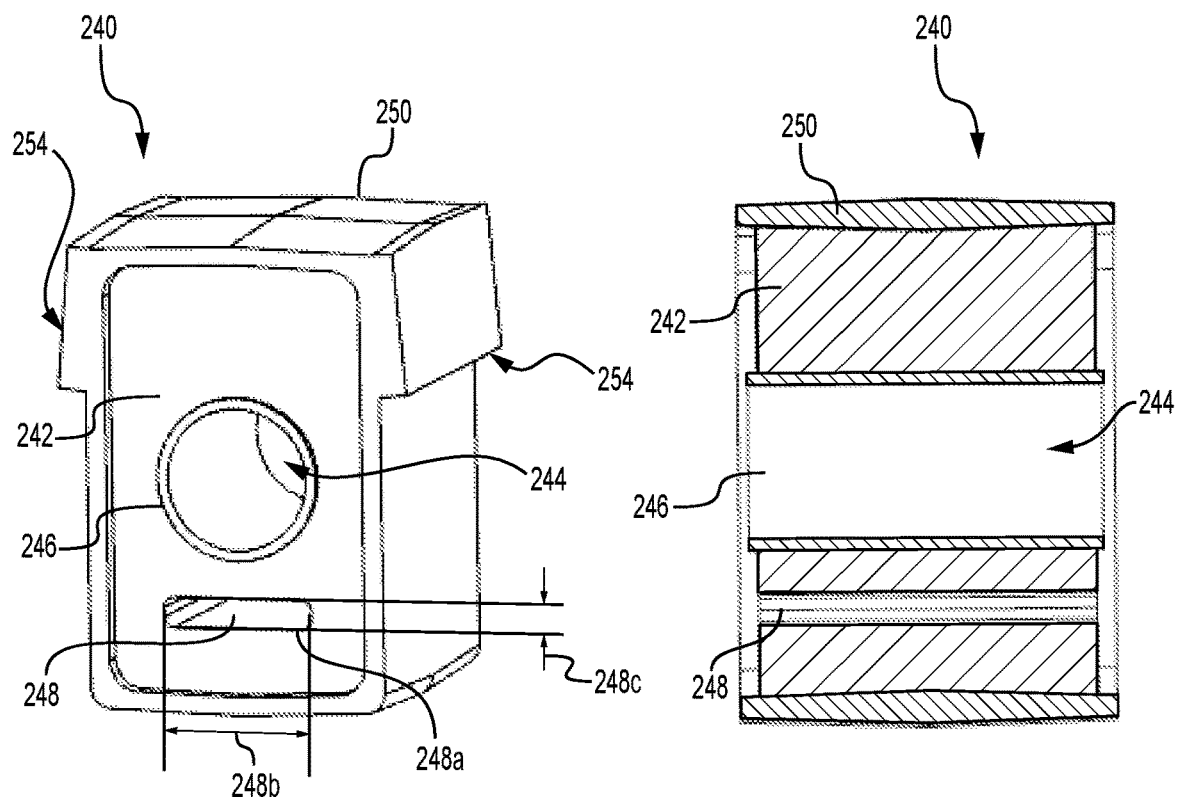
FIG. 17
FIG. 18

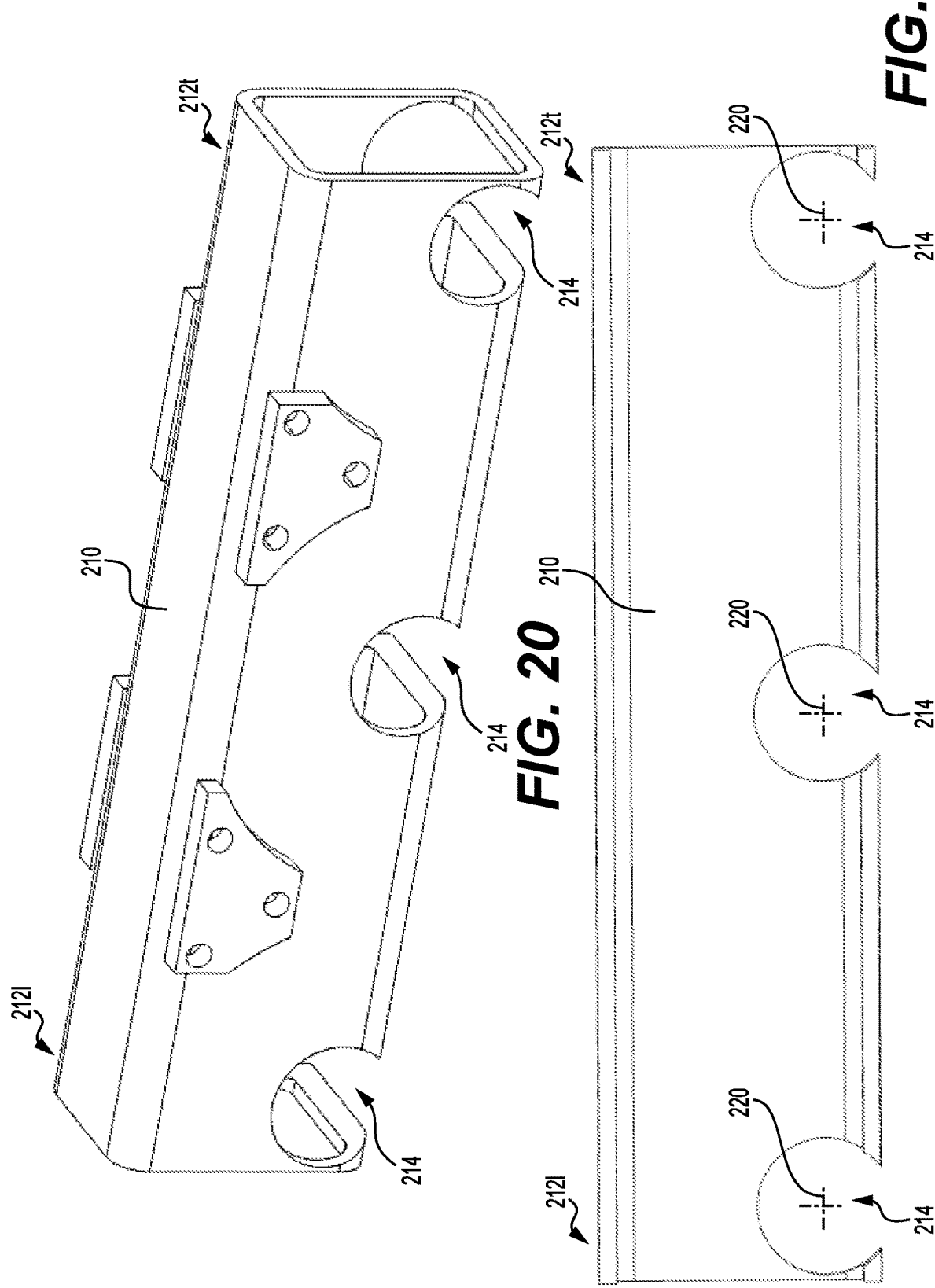

SUSPENDED UNDERCARRIAGE ASSEMBLY FOR A TRACK SYSTEM

CROSS-REFERENCE TO RELATED APPLICATION

The present application claims priority to U.S. Patent Application Ser. No. 62/964,954 entitled "Suspended Undercarriage Assembly For A Track System" and filed on Jan. 23, 2020, which is incorporated herein by reference in its entirety.

FIELD OF THE TECHNOLOGY

The present technology relates to track systems, and more particularly to suspended undercarriage assemblies for track systems.

BACKGROUND

Certain vehicles, such as, for example, agricultural vehicles (e.g., harvesters, combines, tractors, agriculture implement, etc.) and construction vehicles (e.g., bulldozers, front-end loaders, etc.), are used to perform work on ground surfaces that are soft, slippery and/or uneven (e.g., soil, mud, sand, ice, snow, etc.).

Conventionally, such vehicles have had large wheels with tires to move the vehicle along the ground surface. Under some conditions, such tires may have poor traction on some ground surfaces and, as these vehicles are generally heavy, the tires may compact the ground surface in an undesirable way owing to the weight of the vehicle. As an example, when the vehicle is an agricultural vehicle, the tires may compact the soil in such a way as to undesirably inhibit the growth of crops. In order to reduce the aforementioned drawbacks, to increase traction and to distribute the weight of the vehicle over a larger area on the ground surface, track systems were developed to be used in place of at least some of the wheels and tires on the vehicles.

Despite ongoing developments in the field of track systems, there is still room for further improvements for track systems configured to be used on wheeled vehicles. More particularly, improvements related to characteristics of track system, such as ride quality, traction and durability, are desirable. In addition, improving such characteristics in a cost effective manner has proven to be challenging, and thus continued improvements in this area remain desirable.

SUMMARY

It is therefore an object of the present technology to ameliorate the situation with respect to at least one of the inconveniences present in the prior art.

The principles of the present technology are generally embodied in a track system configured to be installed on a vehicle in replacement of one of the wheels of the vehicle, or as standard equipment on the vehicle. The track system of the present technology includes a multi-member frame assembly, leading and trailing idler wheel assemblies, a suspended undercarriage assembly having support wheels assemblies disposed intermediate the leading and trailing idler wheel assemblies, and an endless track.

The suspended undercarriage assembly has resilient bushing assemblies allowing movement of the support wheel assemblies of the track system relative to the multi-member frame assembly of the track system. The track system thus has the capability of absorbing or mitigating at least a portion of the shocks and vibrations induced in the track system when the vehicle equipped with such track system travels over an uneven terrain. Moreover, the suspended undercarriage assembly of the track system allows the endless track of the track system to better conform to the terrain on which the track system travels, at least over a portion of the ground-engaging segment of the endless track.

In accordance with the principles of the present technology, the resilient bushing assemblies allow translational movements and/or pivotal movements of the support wheel assemblies relative to the multi-member frame assembly of the track system.

In accordance with one aspect of the present technology, there is provided a suspended undercarriage assembly connectable to a multi-member frame assembly of a track system, the multi-member frame assembly defining at least one recess. The suspended undercarriage assembly includes a beam having a leading portion and a trailing portion, at least one support wheel assembly connectable to the beam, at least one of a leading resilient bushing assembly connected to the leading portion of the beam, and a trailing resilient bushing assembly connected to the trailing portion of the beam. The at least one of the leading and trailing resilient bushing assemblies being at least partially receivable in the at least one recess for connecting the beam to the multi-member frame assembly, the at least one of the leading and trailing resilient bushing assemblies including a bushing having an opening defined therein and being shaped and dimensioned for promoting deformation of the bushing in at least one of a vertical direction and a lateral direction, the bushing being resiliently deformable to permit movement of the beam relative to the multi-member frame assembly in the vertical direction and in the lateral direction, and to resiliently bias the beam towards a rest position with respect to the multi-member frame assembly.

In some embodiments, the at least one of the leading and trailing bushing assemblies has a bushing housing adapted for connection to the multi-member frame assembly, the bushing being received at least partially within the bushing housing.

In some embodiments, the at least one recess defines a first profile, and the bushing housing defines a second profile being complementary to the first profile, the second profile of the bushing housing being adapted for slidably engaging and retaining the bushing housing in the at least one recess.

In some embodiments, the beam has a leading pin projecting from the leading portion of the beam, the beam has a trailing pin projecting from the trailing portion of the beam, the at least one of the leading resilient bushing assembly and the trailing bushing assembly includes the leading resilient bushing assembly and the trailing bushing assembly, the leading resilient bushing assembly defines a leading aperture sized and dimensioned for receiving the leading pin and for connecting the beam to the leading resilient bushing assembly, and the trailing resilient bushing assembly defines a trailing aperture sized and dimensioned for receiving the trailing pin and for connecting the beam to the trailing resilient bushing assembly.

In some embodiments, in the bushing of the leading resilient bushing assembly, the opening is defined below the leading aperture, and in the bushing of the trailing resilient bushing assembly, the opening is defined below the trailing aperture.

In some embodiments, in the bushing of the leading resilient bushing assembly, the opening has a width that is about equal to a diameter of the leading aperture, and in the bushing of the trailing resilient bushing assembly, the opening has a width that is about equal to a diameter of the trailing aperture.

In some embodiments, in the leading and trailing bushing assemblies, the opening is shaped as a rectangle with rounded corners.

In some embodiments, the at least one support wheel assembly is pivotable with respect to the multi-member frame assembly by an angle ranging between about −5 to +5 degrees with respect to the rest position.

In accordance with another aspect of the present technology, there is provided a track system for a vehicle having a chassis. The track system includes a multi-member frame assembly connectable to the chassis of the vehicle, the multi-member frame assembly defining at least one recess, a leading idler wheel assembly at least indirectly connected to the multi-member frame assembly, a trailing idler wheel assembly at least indirectly connected to the multi-member frame assembly, a suspended undercarriage assembly including a beam having a leading portion and a trailing portion, at least one support wheel assembly connected to the beam, at least one of a leading resilient bushing assembly connected to the leading portion of the beam, and a trailing resilient bushing assembly connected to the trailing portion of the beam, and the at least one of the leading and trailing resilient bushing assemblies being at least partially received in the at least one recess and connecting the beam to the multi-member frame assembly, the at least one of the leading and trailing resilient bushing assemblies including a bushing having an opening defined therein and being shaped and dimensioned for promoting deformation of the bushing in at least one of a vertical direction and a lateral direction, the bushing being resiliently deformable to permit movement of the beam relative to the multi-member frame assembly in the vertical direction and in the lateral direction, and to resiliently bias the beam towards a rest position with respect to the multi-member frame assembly, and an endless track wrapped around the multi-member frame assembly, the leading and trailing idler wheel assemblies, and the suspended undercarriage assembly.

In some embodiments, the multi-member frame assembly includes a primary frame member at least indirectly connectable to the chassis of the vehicle, and at least one secondary frame member connected to the primary frame member, the at least one secondary frame member defining the at least one recess.

In some embodiments, the chassis of the vehicle has a pivot pin extending laterally outwardly, and the primary frame member is pivotably connectable to the chassis of the vehicle via the pivot pin.

In some embodiments, the pivot pin defines a pivot axis, the at least one support wheel assembly includes a first, a second and a third support wheel assembly defining first, second and third support wheel axes, and the pivot axis is longitudinally offset from any one of the first, second and third support wheel axes when the track system is at the rest position.

In some embodiments, the at least one secondary frame member is selectively pivotable relative to the primary frame member about a vertically extending pivot axis to vary a yaw angle of the track system relative to the chassis of the vehicle.

In some embodiments, the primary frame member has a cylindrical projection inserted in an aperture defined in the secondary frame member.

In accordance with yet another aspect of the present technology, there is provided a suspended undercarriage assembly connectable to a multi-member frame assembly of a track system, the multi-member frame assembly defining at least one recess, the suspended undercarriage assembly including a beam having a leading portion and a trailing portion, the beam further comprising a leading pin projecting from the leading portion of the beam and a trailing pin projecting from the trailing portion of the beam, at least one support wheel assembly connectable to the beam, at least one of a leading resilient bushing assembly connected to the leading portion of the beam, and a trailing resilient bushing assembly connected to the trailing portion of the beam, and the at least one of the leading and trailing resilient bushing assemblies including a rectangular housing, and four bushings seated in the corners of the rectangular housing and being propped against the rectangular housing by the corresponding leading and trailing pin.

In some embodiments, the suspended undercarriage assembly further includes at least one resilient pad connected to the beam and configured to abut the multi-member frame assembly.

In some embodiments, the four bushings define four openings, each one of the openings extending between adjacent bushings and being shaped and dimensioned for promoting deformation of the corresponding bushing assembly in at least one of a vertical direction and a lateral direction.

In some embodiments, the leading pin and the trailing pin have a diamond-shaped cross-section.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Should there be any difference in the definitions of term in this application and the definition of these terms in any document included herein by reference, the terms as defined in the present application take precedence.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 16 is a close-up perspective view taken from a top, rear, right side of a trailing pin of the suspended undercarriage assembly of FIG. 13;

FIG. 17 is a perspective view taken from a top, rear, right side of a resilient bushing assembly of the suspended undercarriage assembly of FIG. 13;

FIG. 18 is a longitudinal cross-sectional view of the resilient bushing assembly of FIG. 17;

FIG. 20 is a perspective view taken from a top, front, right side of the beam of FIG. 19;

FIG. 21 is right side elevation view of the beam of FIG. 19;

FIG. 29 is a perspective view taken from a top, rear, right side of the suspended undercarriage assembly of the track system of FIG. 26;

FIG. 30 is a perspective view taken from a bottom, rear, right side of the suspended undercarriage assembly of the track system of FIG. 26;

DETAILED DESCRIPTION

Figure 1:
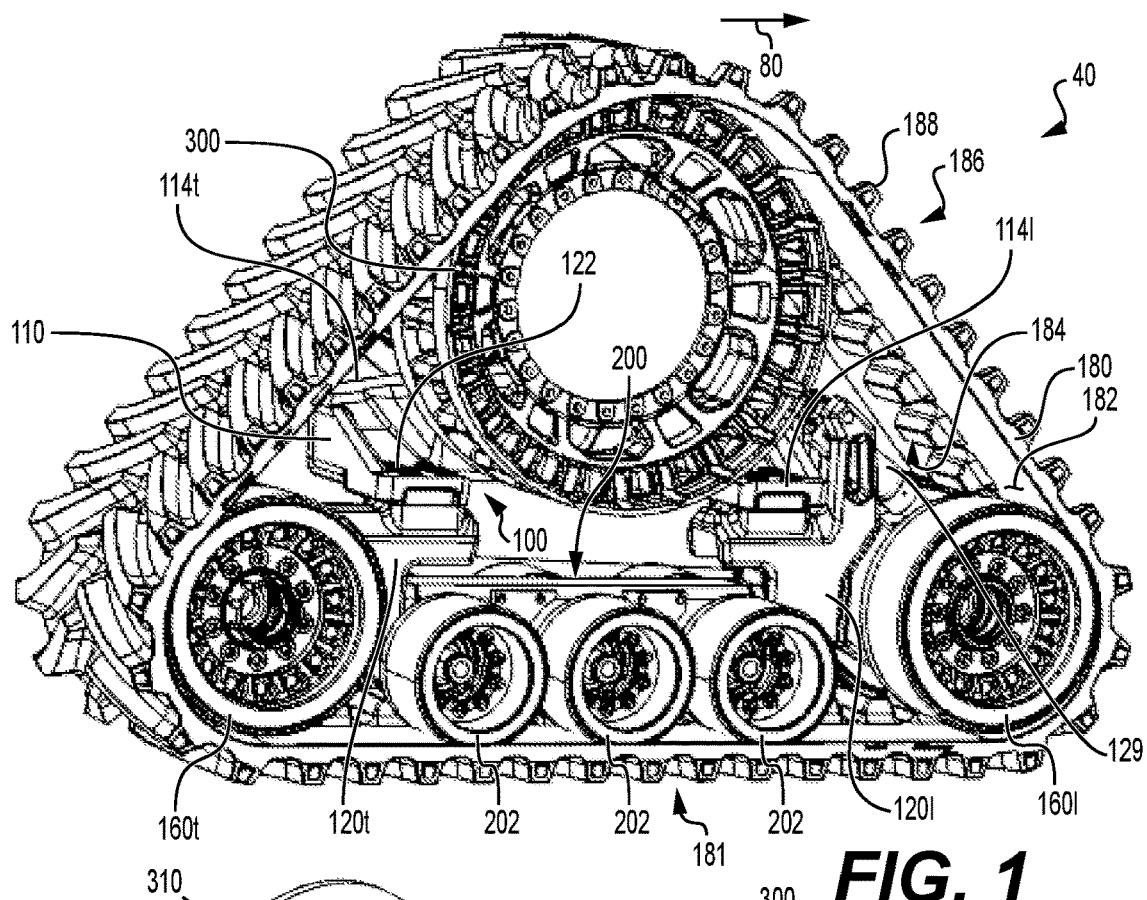
FIG. 1 is a perspective view taken from a top, rear, right side of a track system having a suspended undercarriage assembly according to one embodiment of the present technology.

With reference to FIGS. 1 to 21, a first embodiment of the present technology, suspended undercarriage assembly 200, will be described in relation to a track system 40. It is to be expressly understood that the suspended undercarriage assembly 200 is merely an embodiment of the present technology. Thus, the description thereof that follows is intended to be only a description of illustrative examples of the present technology. This description is not intended to define the scope or set forth the bounds of the present technology. In some cases, what are believed to be helpful examples of modifications or alternatives to the suspended undercarriage assembly 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing or embodying that element of the present technology. As a person skilled in the art would understand, this is likely not the case. In addition, it is to be understood that the suspended undercarriage assembly 200 may provide in certain aspects a simple embodiment of the present technology, and that where such is the case it has been presented in this manner as an aid to understanding. As persons skilled in the art would understand, various embodiments of the present technology may be of a greater complexity than what is described herein.

The track system 40 is for use with a vehicle 60 (schematically shown in FIGS. 6 and 11) having a chassis 62, a drive shaft 68 extending laterally outwardly from the chassis 62 for driving the track system 40, and a pivot pin 64 extending laterally outwardly from the chassis 62 for connection to the track system 40. The chassis 62 supports the various components of the vehicle 60. In some embodiments, the vehicle 60 is an agricultural vehicle. However, the track system 40 could be used on different types of vehicles that serve many different functions. In addition, it is contemplated that the track system 40 could be connected otherwise to the chassis 62 of the vehicle 60. For example and as shown in FIG. 12A, the track system 40 could be only connected to the vehicle 60 via the drive shaft 68.

In the context of the following description, "outward" or "outwardly" means away from a longitudinal center plane 66 (FIGS. 6 and 11) of the chassis 62 of the vehicle 60, and "inward" or "inwardly" means toward the longitudinal center plane 66. In addition, in the context of the following description, "longitudinal" or "longitudinally" means in a direction parallel to the longitudinal center plane 66 of the chassis 62 of the vehicle 60 in a plane parallel to flat level ground, "lateral" or "laterally" means in a direction perpendicular to the longitudinal center plane 66 in a plane parallel to flat level ground, and "vertical" or "vertically" means in a direction perpendicular to the longitudinal center plane 66 along a height direction of the track system 40 in a plane perpendicular to flat level ground. Note that in the Figures, a "+" symbol is used to indicate an axis of rotation or pivot. In the context of the present technology, the term "axis" may be used to indicate an axis of rotation, or the term may refer to a "pivot joint" that includes all the necessary structure (bearing structures, pins, axles and other components) to permit a structure to pivot about such axis, as the case may be.

Moreover, the direction of forward travel of the track system 40 is indicated by an arrow 80 (FIG. 1). In the present description, the "leading" components are identified with an "l" added to their reference numeral (i.e. components towards the front of the vehicle defined consistently with the vehicle's forward direction of travel), and the "trailing" components are identified with a "t" added to their reference numeral (i.e. components towards the rear of the vehicle defined consistently with the vehicle's forward direction of travel). In the following description and accompanying Figures, the track system 40 is configured to be attached to a right side of the chassis 62 of the vehicle 60.

A track system 1040 illustrated in FIGS. 22 to 30, having a suspended undercarriage assembly 1200 being another embodiment of the present technology, is also configured to be connected to a right side of the chassis 62 of the vehicle 60. Several components of the track system 1040 are the same or similar to the components of the track system 40. Therefore, for simplicity, components of the track system 1040 that are the same as or similar to those of the track system 40 have been labeled with the same reference numerals, but in the 1000 series, and will not be described in detail unless otherwise mentioned. Another track system 2040 illustrated in FIGS. 31 to 39, having a suspended undercarriage assembly 2200 in accordance with yet another embodiment of the present technology, is also configured to be connected to a right side of the chassis 62 of the vehicle 60. Several components of the track system 2040 are the same or similar to the components of the track system 40, 1040. Therefore, for simplicity, components of the track system 2040 that are the same as or similar to those of the track systems 40, 1040 have been labeled with the same reference numerals, but in the 2000 series, and will not be described in detail unless otherwise mentioned.

Furthermore, it is to be understood in the present description that a wheel assembly includes one or more wheels, an axle for supporting the one or more wheels, and the components (bearings, seals, etc.) that are necessary for the wheel(s) to rotate. As such, the different wheel assemblies will not be described in great details in the current description. Moreover, the expression "at least indirectly connected" is understood to mean that a component may be connected to another component via one or more intermediate structures or members, and that these intermediate structures are not necessarily described in the current description. Finally, the expression "track system is at a rest position" is understood to mean that the track system 40 is connected to the vehicle 60, is stationary, and is disposed on flat, level ground.

Figure 2:
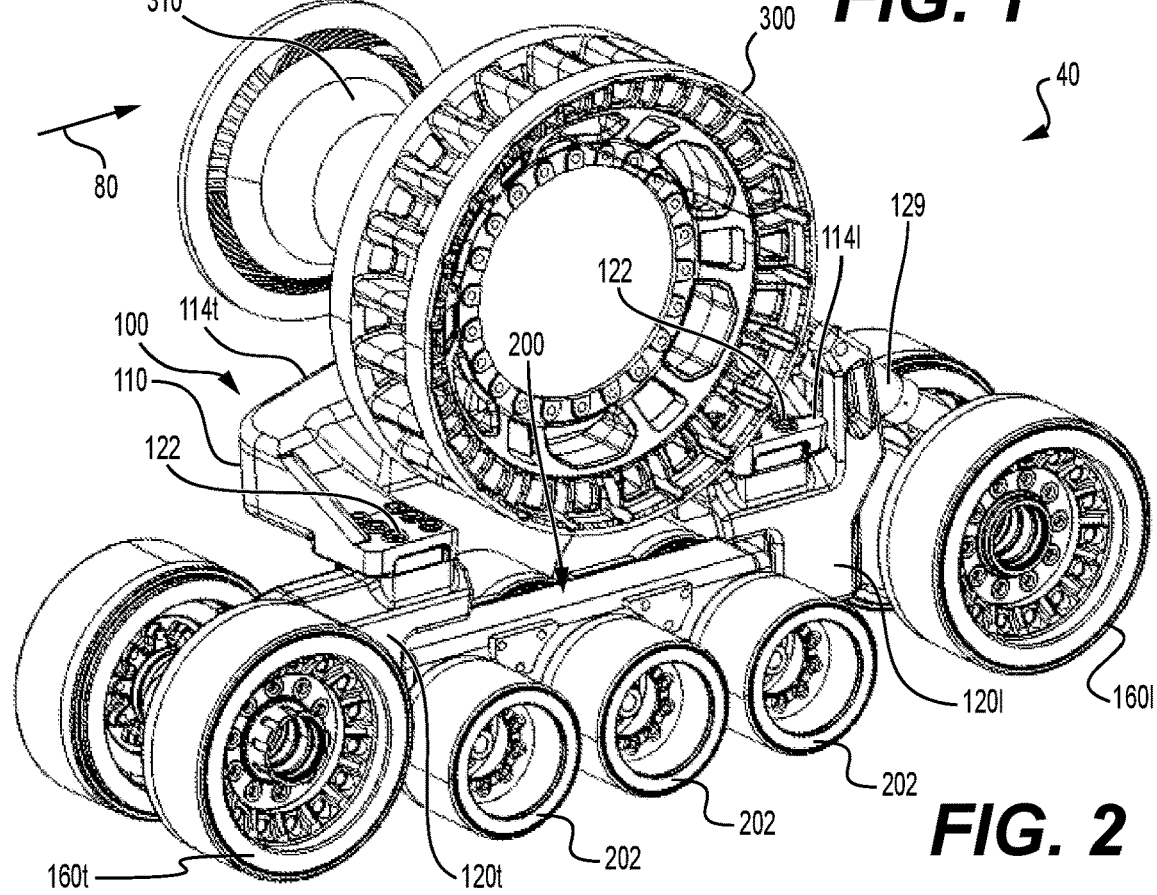
FIG. 2 is a perspective view taken from a top, rear, right side of the track system of FIG. 1, with the endless track removed.
Figure 3:
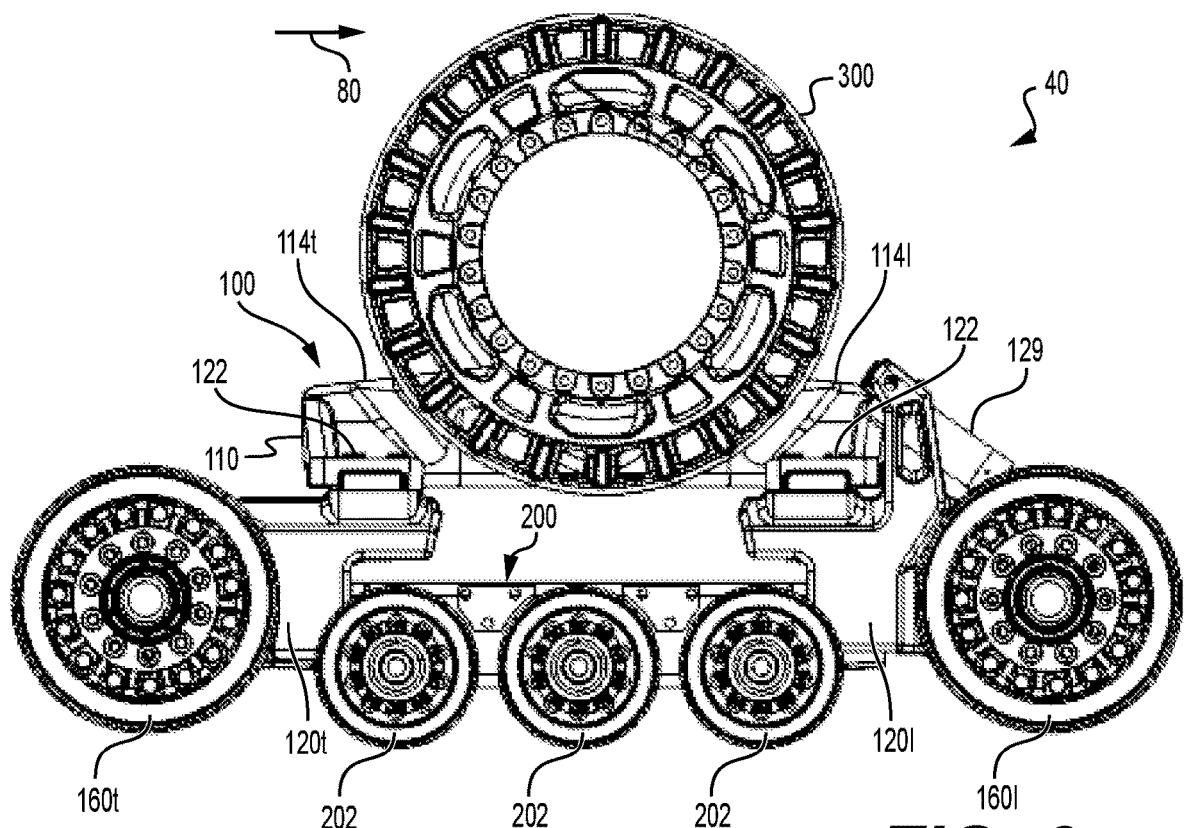
FIG. 3 is a right side elevation view of the track system of FIG. 2.
Figure 4:
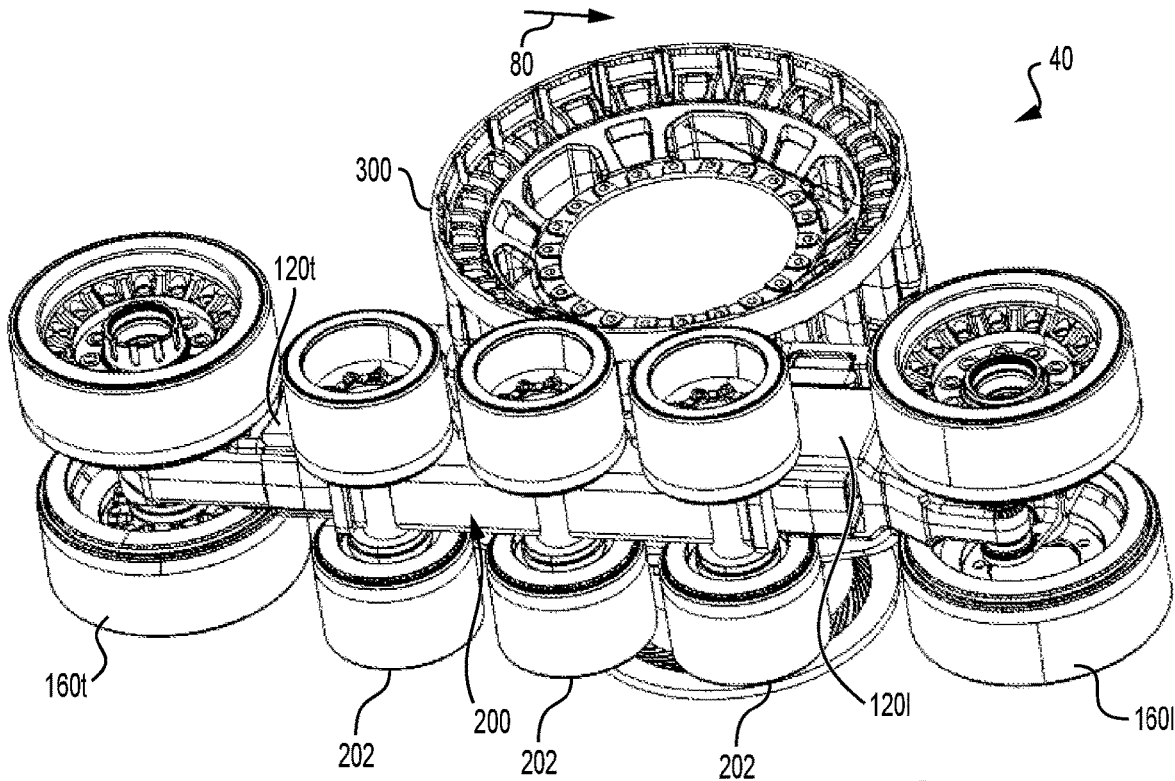
FIG. 4 is a perspective view taken from a bottom, front, right side of the track system of FIG. 2.
Figure 5:
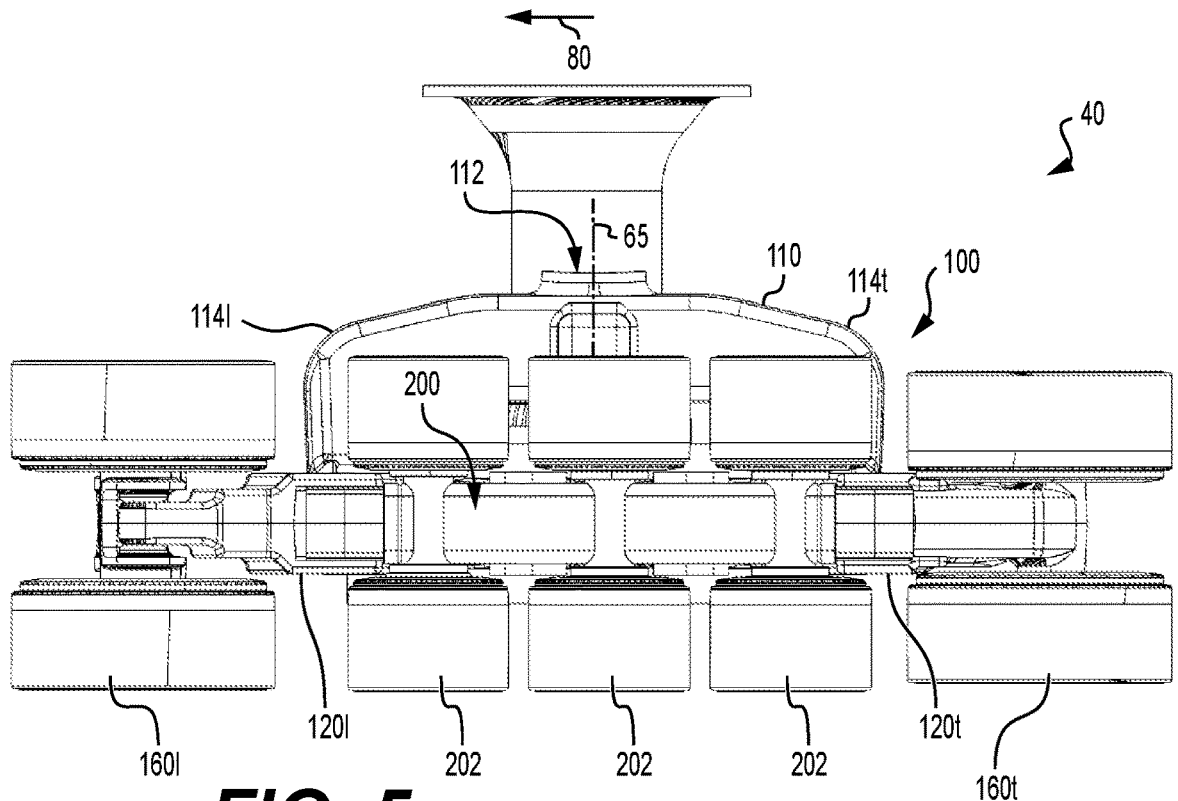
FIG. 5 is a bottom plan view of the track system of FIG. 2.
Figure 6:
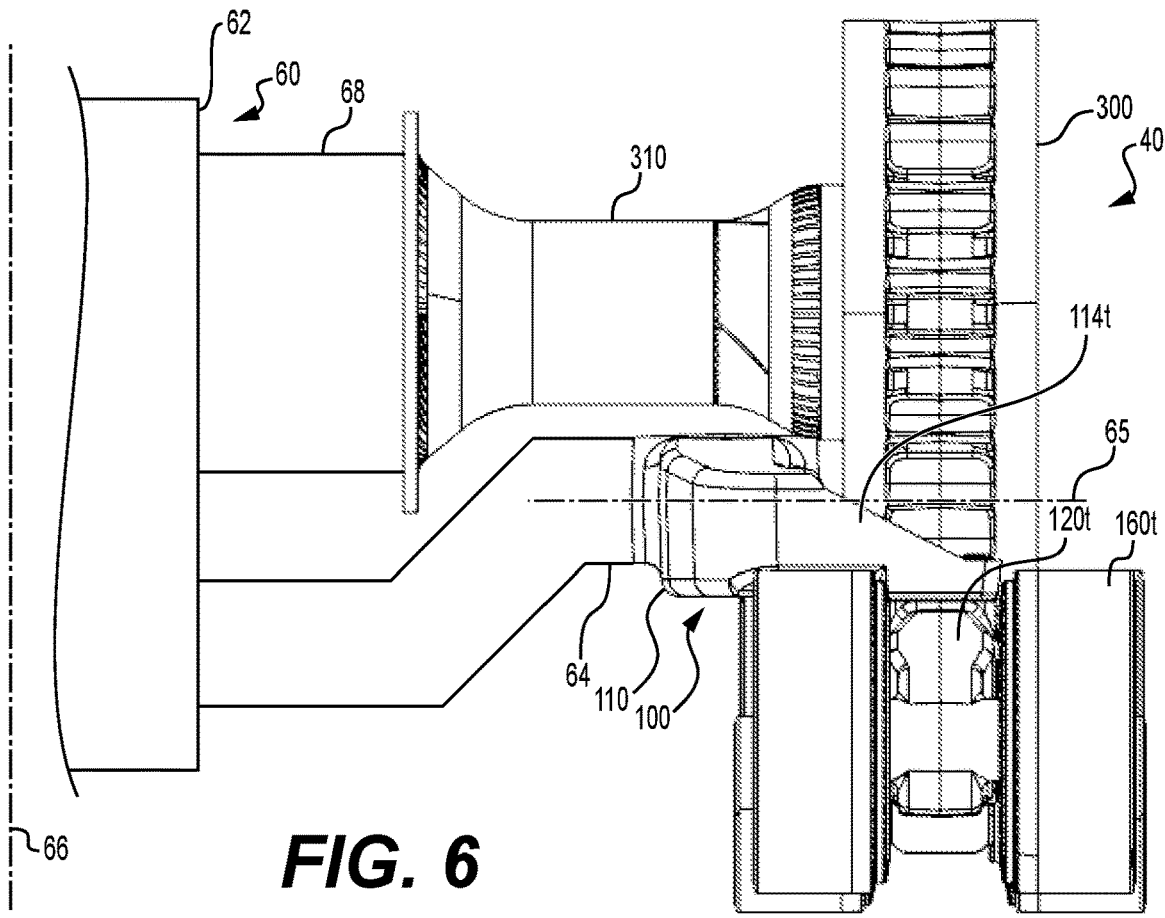
FIG. 6 is a rear view of the track system of FIG. 2.

Referring to FIGS. 1 to 3, the track system 40 will be generally described. The track system 40 has a multi-member frame assembly 100 connected to the chassis 62 of the vehicle 60. The multi-member frame assembly 100 includes a primary frame member 110 connectable to the pivot pin 64 of the vehicle 60 (FIG. 6). The multi-member frame assembly 100 further has leading and trailing secondary frame members 120*l*, 120*t* connected to the primary frame member 100. Leading and trailing idler wheel assemblies 160*l*, 160*t*, also known in the art as guide wheels, are at least indirectly connected to the leading and trailing secondary frame members 120*l*, 120*t* respectively. More particularly, the leading idler wheel assembly 160*l* is indirectly connected to the leading secondary frame member 120*l* via a tensioner assembly 129 adapted to move the leading idler wheel assembly 160*l* forward and backward in order to control tension in an endless track 180 of the track system 40. The track system 40 further has a suspended undercarriage assembly 200 that is connected to the leading and trailing secondary frame members 120*l*, 120*t*. The suspended undercarriage assembly 200 has support wheel assemblies 202, also known in the art as road wheels or roller wheels, disposed intermediate the leading idler wheel assembly 160*l* and the trailing idler wheel assembly 160*t*. The support wheel assemblies 202 and the idler wheel assemblies 160*l*, 160*t* distribute the load born by the track system 40 over a ground-engaging segment 181 of the endless track 180 (FIG. 1). The track system 40 further has a sprocket wheel 300 that is used to drive the endless track 180. The sprocket wheel 300 is connected to a sprocket axle 310 that is operatively connected to the drive shaft 68 of the vehicle 60. The drive shaft 68 of the vehicle 60 is operatively connected to the engine of the vehicle 60, and transmits the torque and power necessary for driving the sprocket wheel 300, which in turn drives the endless track 180. The endless track 180 extends around the primary frame member 110, the leading and trailing secondary frame members 120*l*, 120*t*, the leading idler wheel assembly 160*l*, the trailing idler wheel assembly 160*t*, and the support wheel assemblies 202.

The endless track 180 is an endless polymeric track. The endless track 180 has an inner surface 182 engaging the leading idler wheel assembly 120*l*, the trailing idler wheel assembly 120*t*, the support wheel assemblies 202 and the sprocket wheel 300. Lugs 184 are disposed on a central portion of the inner surface 182. The leading and trailing idler and support wheel assemblies 120*l*, 120*t*, 202 have laterally spaced-apart wheels engaging the inner surface 182 of the endless track 180 on either side of the lugs 184. The endless track 180 also has an outer surface 186 with a tread 188 selected for ground engagement. The tread 188 varies in different embodiments according to the type of vehicle on which the track system 40 is to be used with and/or the type of ground surface on which the vehicle is destined to travel. It is contemplated that within the scope of the present technology, the endless track 180 may be constructed of a wide variety of materials and structures including metallic components known in track systems. The specific properties and materials of the endless track 180 are not central to the present technology and will not be described in detail.

Figure 7:
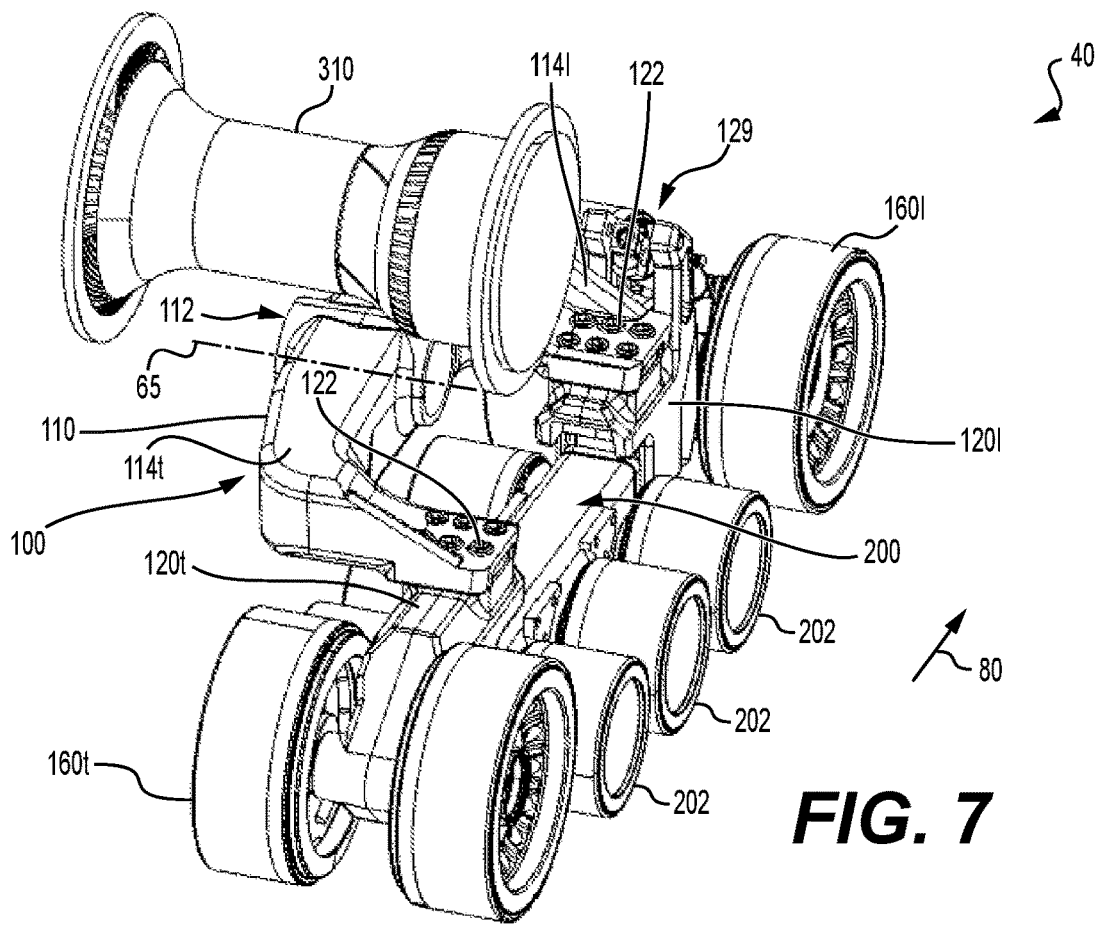
FIG. 7 is a perspective view taken from a top, rear, right side of the track system of FIG. 2, with the sprocket wheel removed.
Figure 8:
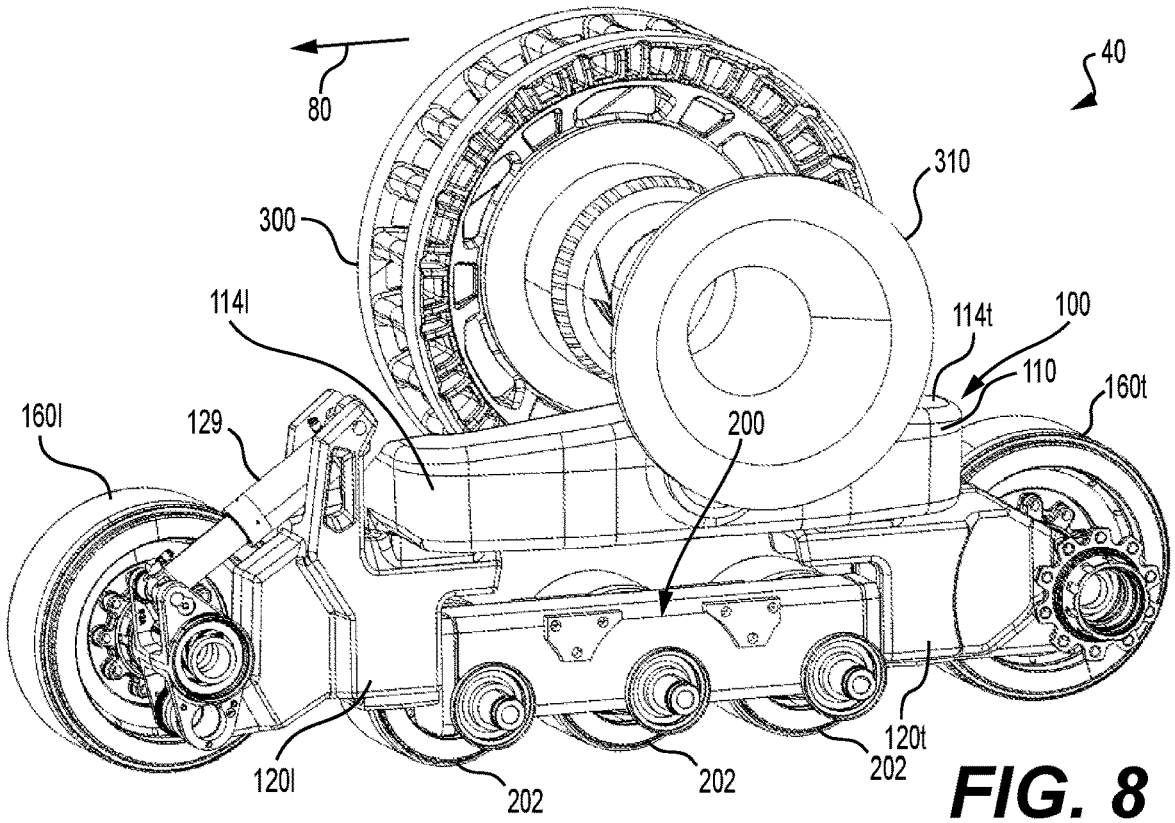
FIG. 8 is a perspective view taken from a top, front, left side of the track system of FIG. 2.
Figures 9, 10A:
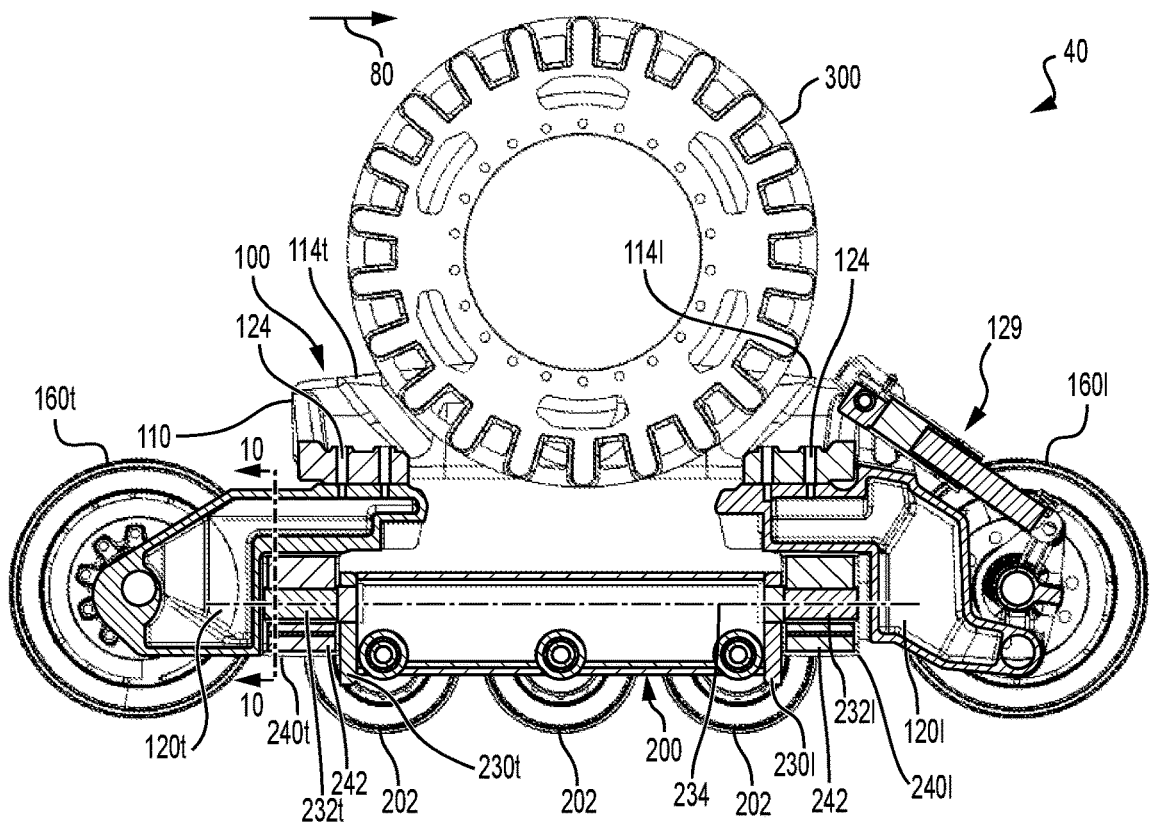
FIG. 9 is a longitudinal cross-sectional view of the track system of FIG. 2.
FIG. 10A is a cross-sectional perspective view taken from a rear, right side of the track system of FIG. 2 taken along cross-section line 10-10 of FIG. 9, with the support wheel assemblies at a rest position.
Figure 10B:
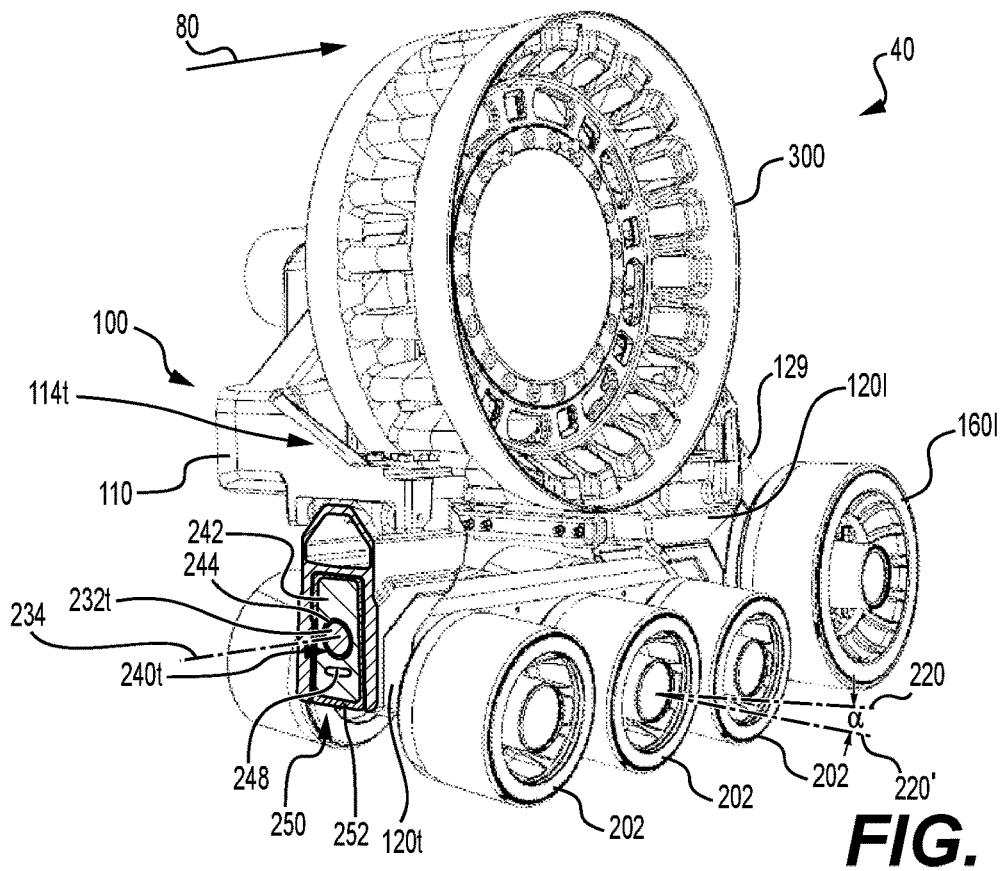
FIG. 10B is a cross-sectional perspective view taken from a rear, right side of the track system of FIG. 2 taken along cross-section line 10-10 of FIG. 9, with the support wheel assemblies pivoted 5 degrees in a first direction.
Figure 10C:
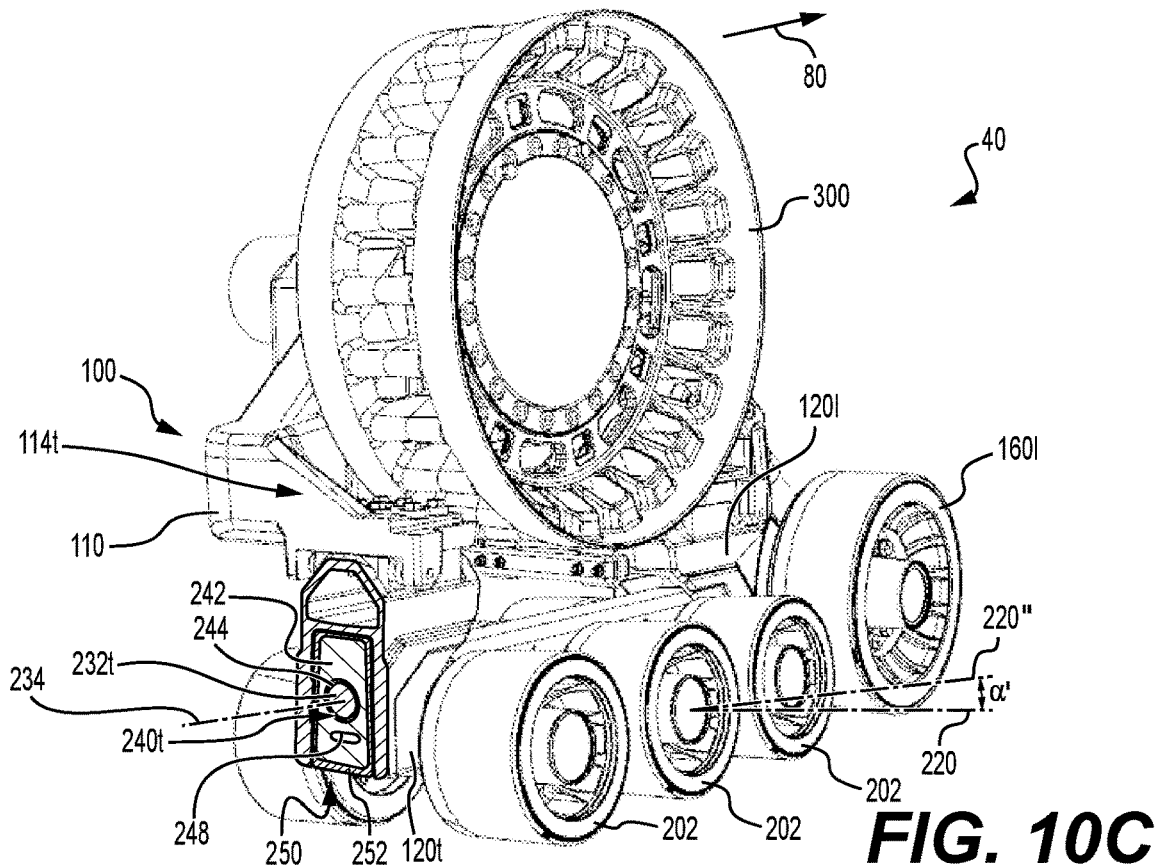
FIG. 10C is a cross-sectional perspective view taken from a rear, right side of the track system of FIG. 2 taken along cross-section line 10-10 of FIG. 9, with the support wheel assemblies pivoted 5 degrees in a second direction.

Referring to FIGS. 6 to 8, the primary frame member 110 will be described in more details. The primary frame member 110 defines an aperture 112 sized and dimensioned for receiving the pivot pin 64 that extends laterally outwardly from the chassis 62 of the vehicle 60, or from another component that is connected to the chassis 62 of the vehicle 60 as will be described below. The pivot pin 64 defines a pivot axis 65. The load born by the track system 40 is transmitted from the chassis 62 to the pivot pin 64, and to the primary frame member 110 and in turn to the leading and trailing secondary frame members 120*l*, 120*t*, to the wheel assemblies 160*l*, 160*t*, 202, and to the ground-engaging segment 181 of the endless track 180. It is to be noted that the sprocket wheel 300 does not bear a material portion of the load born by the track system 40. When the track system 40 is connected to the vehicle 60 via the pivot pin 64 and the primary frame member 110, the primary frame member 110 is pivotally connected to the chassis 62 of the vehicle 60. As such, when the vehicle 60 travels on a slopped terrain, the track system 40 can pitch positively or negatively about the pivot axis 65 to conform to the contour of the terrain. The primary frame member 110 has a U-shape with a leading portion 114*l* extending forward the aperture 112 and below the sprocket wheel 300, and a trailing portion 114*t* extending rearward the aperture 112 and below the sprocket wheel 300.

Referring to FIG. 12A, the primary frame member 110 is typically made of rigid material, such as aluminum, steel or any other suitable material. In some embodiments, the leading portion 114*l* and the trailing portion 114*t* are separate components that are connected together. In some embodiments, the pivot pin 64 is part of the primary frame member 110, and a pin recess (not shown) is defined in the chassis 62 of the vehicle 60. In some embodiment, the pivot pin 64 is part of an adapter assembly (not shown) installed between the vehicle 60 and the track system 40. An example of the latter configuration is described in Patent Application No. PCT/IB2017/050721—"Steering Knuckle, Steerable Track System, and Vehicle" and in Patent Application No. PCT/M2017/054986—"Steering Knuckle Gearbox Assembly", wherein an adapter plate including a pin is installed between the vehicle and the track system in order to allow a pivotable installation of a track kit assembly on a vehicle. Both of these patent applications are incorporated-by-reference in their entirety. In some embodiments, the track system 40 is configured to be operatively connected to a steering assembly of the vehicle 60, and thus be steerable. In some embodiments, a gearbox is operatively connected between the track system 40 and the drive shaft 68 of the vehicle 60. In some embodiments, the track system 40 is configured to be installed on a non-driving vehicle axle shaft.

Figure 11:
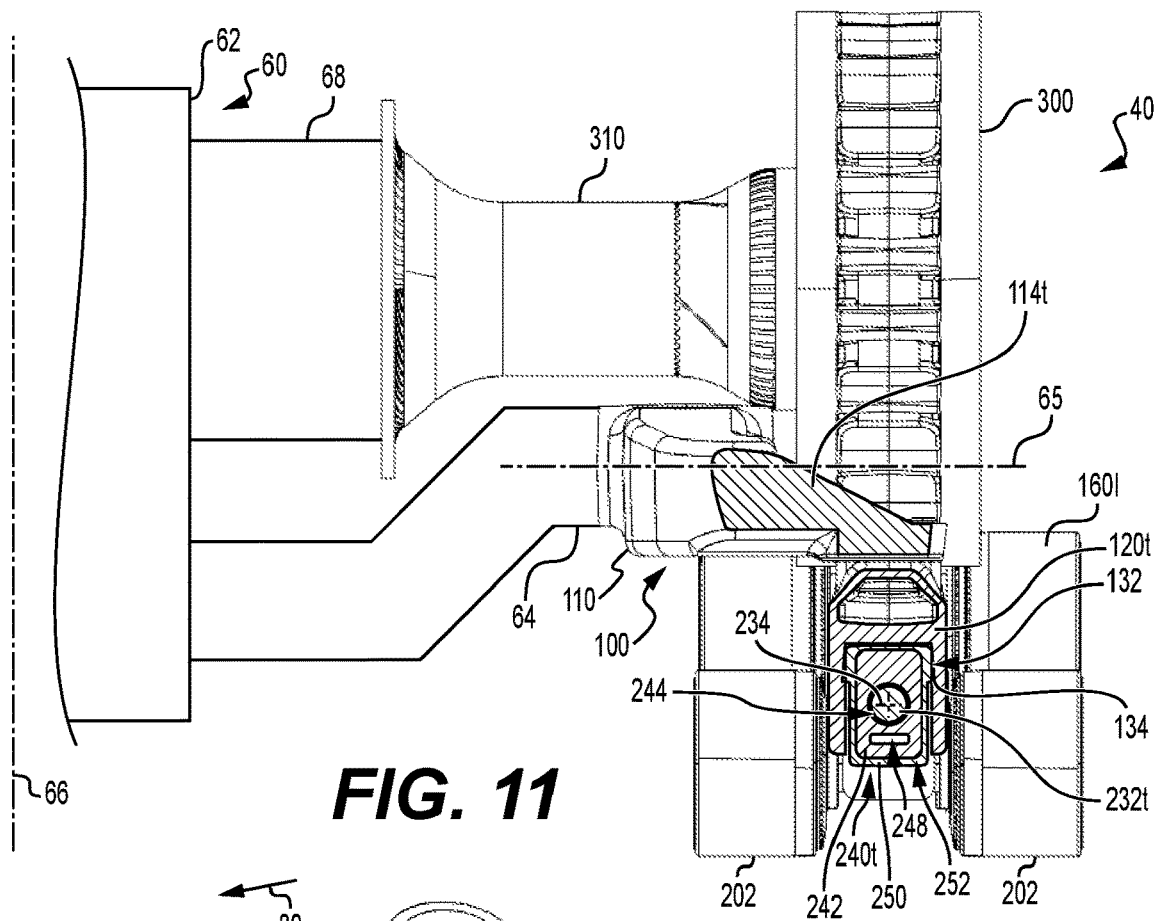
FIG. 11 is a cross-sectional view of the track system of FIG. 2 taken along cross-section line 10-10 of FIG. 9.
Figure 12A:
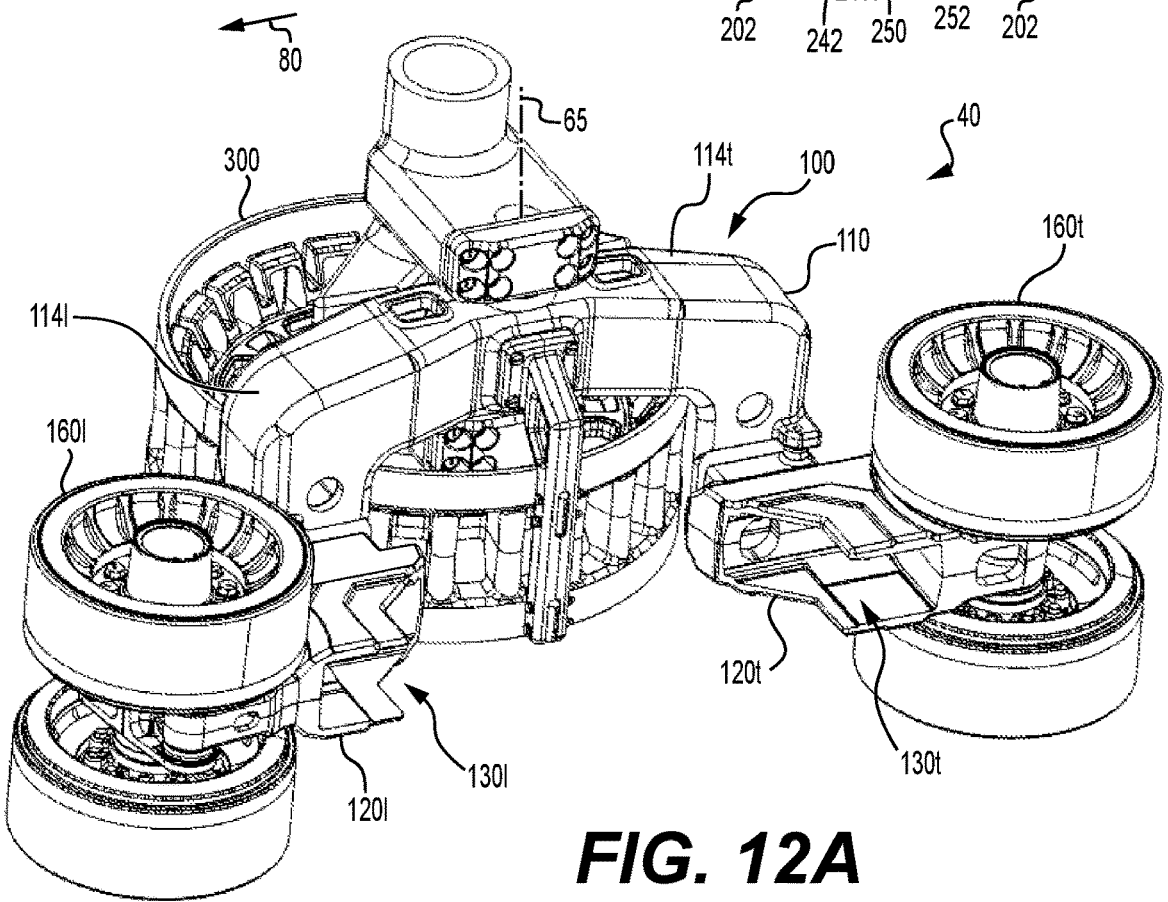
FIG. 12A is a perspective view taken from a bottom, front, left side of the track system of FIG. 2, with the suspended undercarriage assembly removed.
Figure 12B:
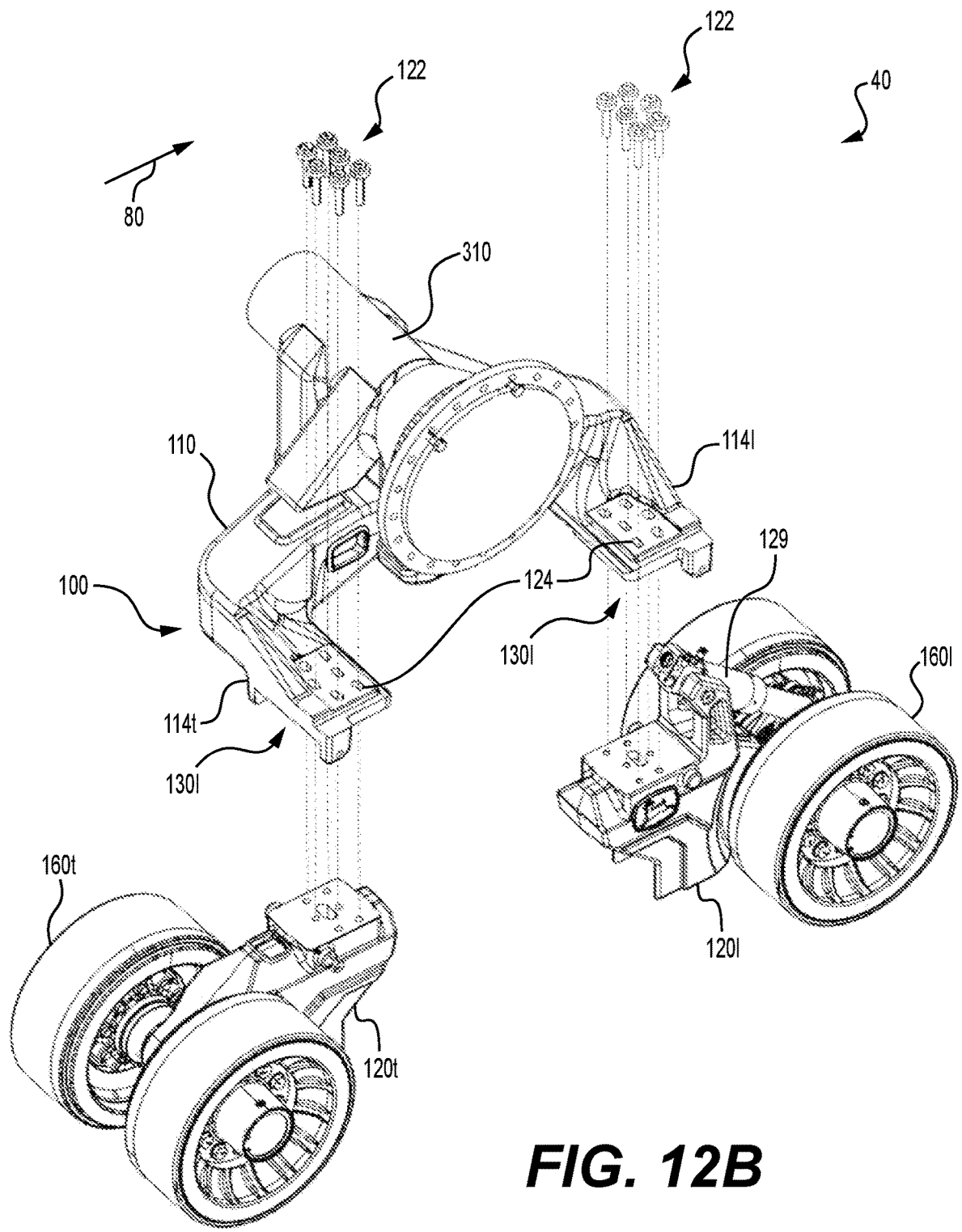
FIG. 12B is a partially exploded, perspective view taken from a top, rear, right side of the track system of FIG. 12A.
Figure 12C:
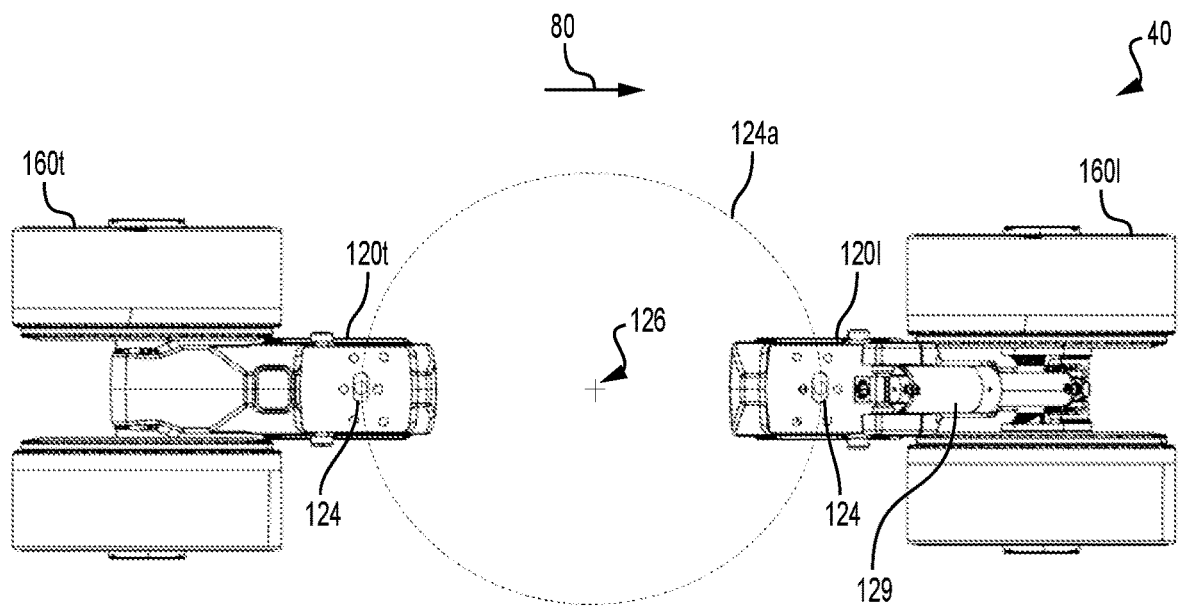
FIG. 12C is a top plan view of the leading and trailing secondary frame members of the track system of FIG. 12A.

Referring to FIGS. 8 to 12C, the leading and trailing secondary frame members 120*l*, 120*t* are respectively connected to the leading and trailing portions 114*l*, 114*t* of the primary frame member 110 via fasteners 122 (FIG. 12B). Arcuate slotted holes 124 defined in each of the leading and trailing portions 114*l*, 114*t* of the primary frame member 110 allow for selective positioning of the leading and trailing secondary frame members 120*l*, 120*t* relative to the primary frame member 110. The arcuate slotted holes 124 have a radius of curvature corresponding to that of circle 124*a* shown in FIG. 12C. The radius of curvature of the slotted holes 124 could differ in other embodiments. More particularly, using the fasteners 122 and the arcuate slotted holes 124, the leading and trailing secondary frame members 120*l*, 120*t* can be selectively pivoted relative to the primary frame member 110 about a virtual pivot axis 126 extending vertically (FIG. 12C) and being at the center of the circle 124*a* in order to vary a yaw angle of the track system 40 relative to the chassis 62 of the vehicle 60. For example, the leading secondary frame member 120*l* can be selectively pivoted away from the longitudinal center plane 66 before being connected to the leading portion 114*l* of the primary frame member 110 using the fasteners 122, and the trailing secondary frame member 120*t* can be selectively pivoted towards the longitudinal center plane 66 before being connected to the trailing portion 114*t* of the primary frame member 110 using the fasteners 122, thus positioning the track system 40 at a "toe-out" angle relative to the chassis 62 of the vehicle 60. Conversely, the leading secondary frame member 120*l* can be selectively pivoted towards the longitudinal center plane 66 before being connected to the leading portion 114*l* of the primary frame member 110 using the fasteners 122, and the trailing secondary frame member 120*t* can be selectively pivoted away from the longitudinal center plane 66 before being connected to the trailing portion 114*t* of the primary frame member 110 using the fasteners 122, thus positioning the track system 40 at a "toe-in" angle relative to the chassis 62 of the vehicle 60.

The leading and trailing secondary frame members 120*l*, 120*t* are also typically made of rigid material, such as aluminum, steel or any other suitable material. In the present embodiment, the leading and trailing secondary frame members 120*l*, 120*t* are hollow, but could be solid in other embodiments. Hollow leading and trailing secondary frame members 120*l*, 120*t* may assist in reducing the overall weight of the multi-member frame assembly 100 while substantially maintaining the structural properties of the multi-member frame assembly 100. In some embodiments, it is contemplated that the leading and trailing secondary frame members 120*l*, 120*t* could be a unitary component instead of two separate components.

Still referring to FIGS. 8 to 12C, the leading and trailing secondary frame members 120*l*, 120*t* define a leading recess 1301 and a trailing recess 130t respectively (FIG. 12A). As best seen in FIG. 12A, the leading and trailing recesses 1301, 130t are accessible in the vertical direction from the region extending below the leading and trailing secondary frame members 120l, 120t, and in the longitudinal direction from the region extending between the leading and trailing secondary frame members 120l, 120t. The recesses 1301, 130t have a profile 132 (i.e. a lateral cross-section) that has a generally rectangular shape, with shoulders 134 defined on the vertically extending sides of the profile 132 (FIG. 11), the shoulders 134 projecting laterally from the vertically extending sides of the profile 132. The recesses 1301, 130t could be shaped otherwise in other embodiments. As will be described below, the leading and trailing recesses 1301, 130t are sized and dimensioned for receiving portions of the suspended undercarriage assembly 200, and for connecting the suspended undercarriage assembly 200 to the multi-member frame assembly 100.

Figure 13:
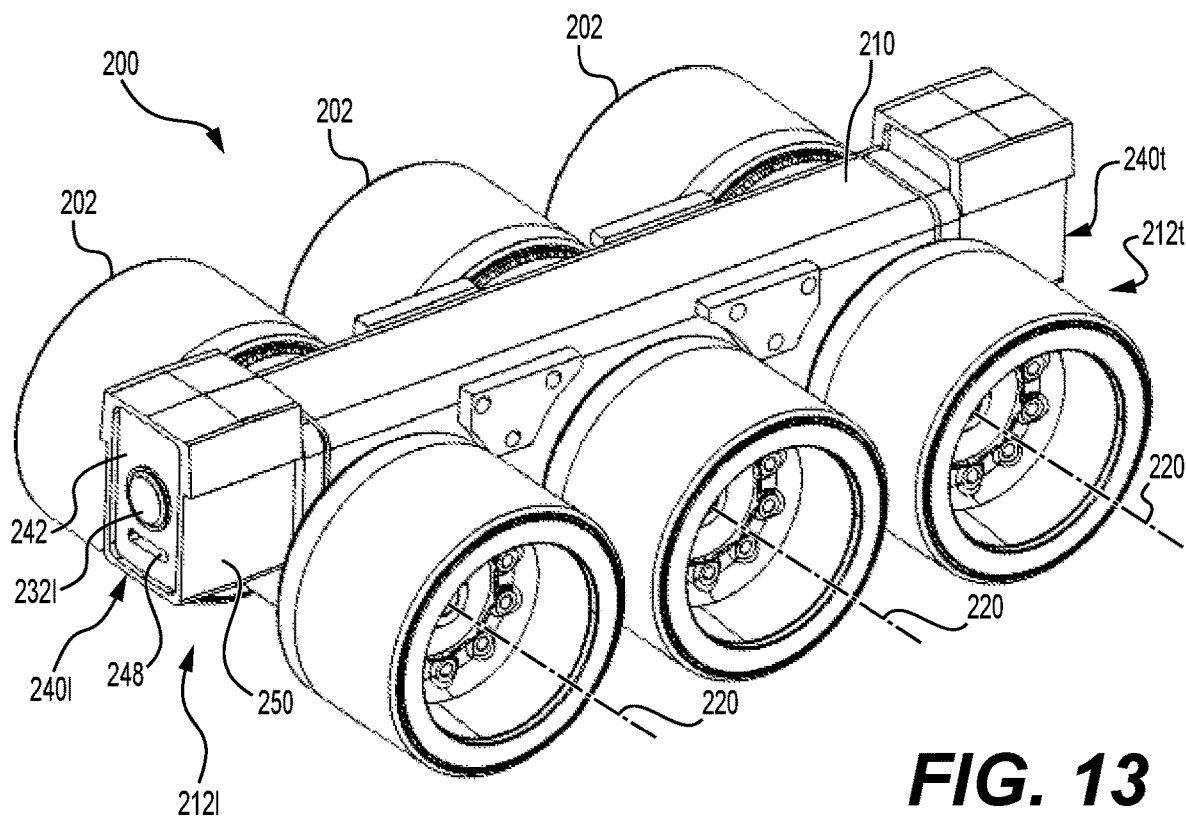
FIG. 13 is a perspective view taken from a top, rear, right side of the suspended undercarriage assembly of the track system of FIG. 1.
Figure 14:
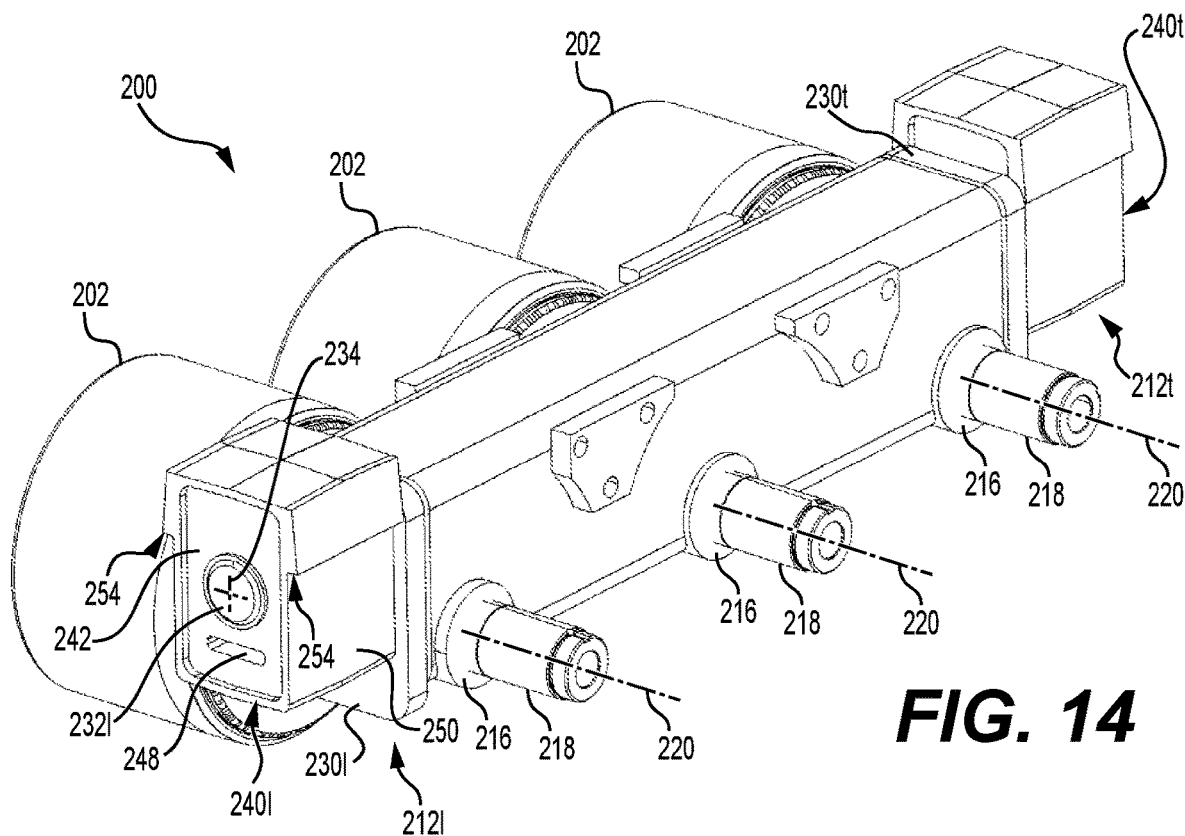
FIG. 14 is a perspective view taken from a top, rear, right side of the suspended undercarriage assembly of FIG. 13, with the right support wheels removed.
Figure 15:
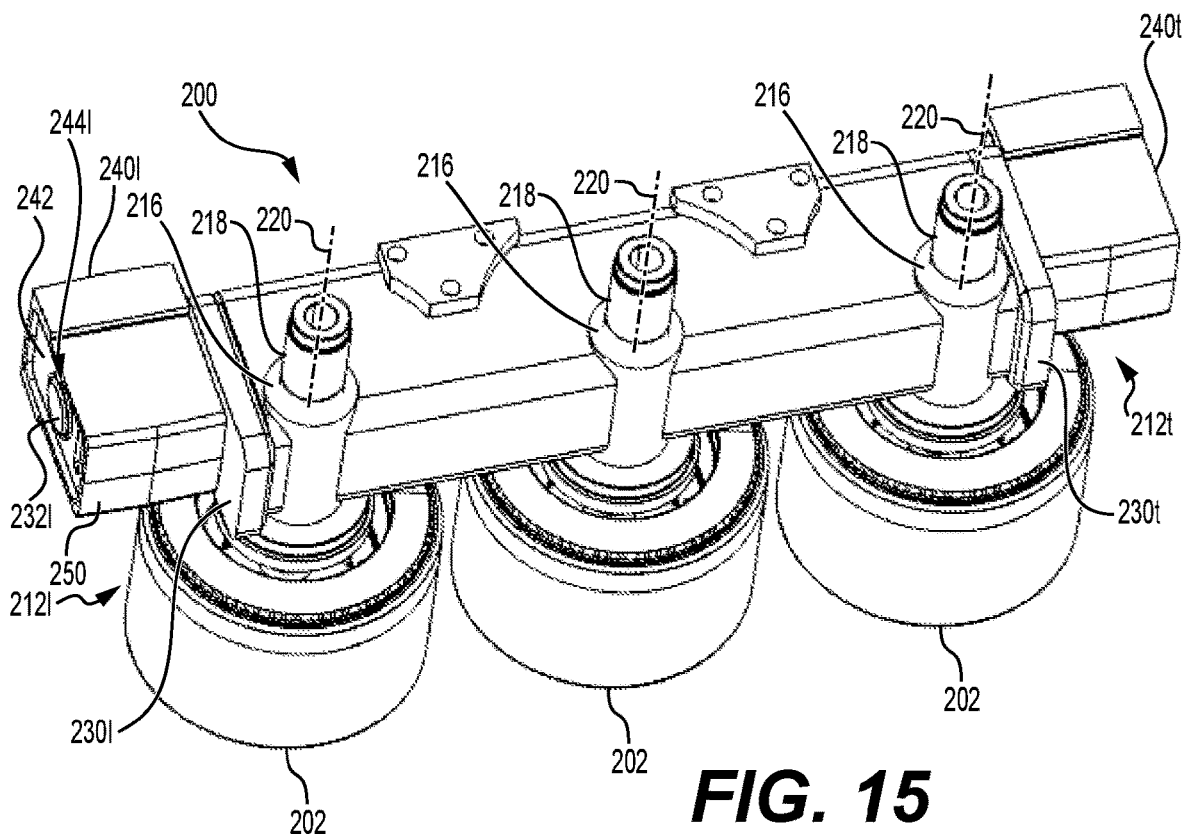
FIG. 15 is a perspective view taken from a bottom, rear, right side of the suspended undercarriage assembly of FIG. 14.
Figure 19:
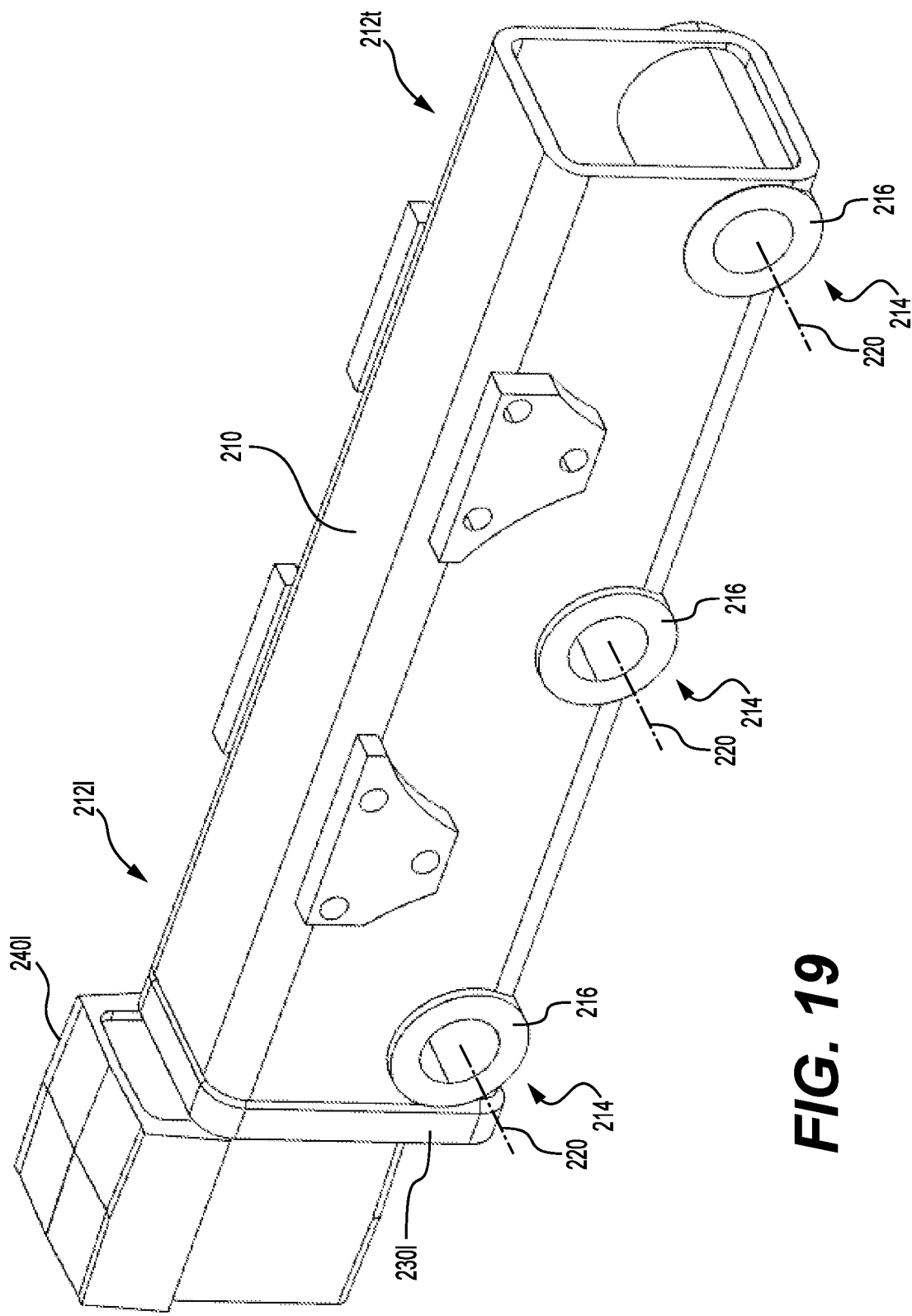
FIG. 19 is a perspective view taken from a top, front, right side of a beam and the trailing resilient bushing assembly of the suspended undercarriage assembly of FIG. 13.
Figure 22:
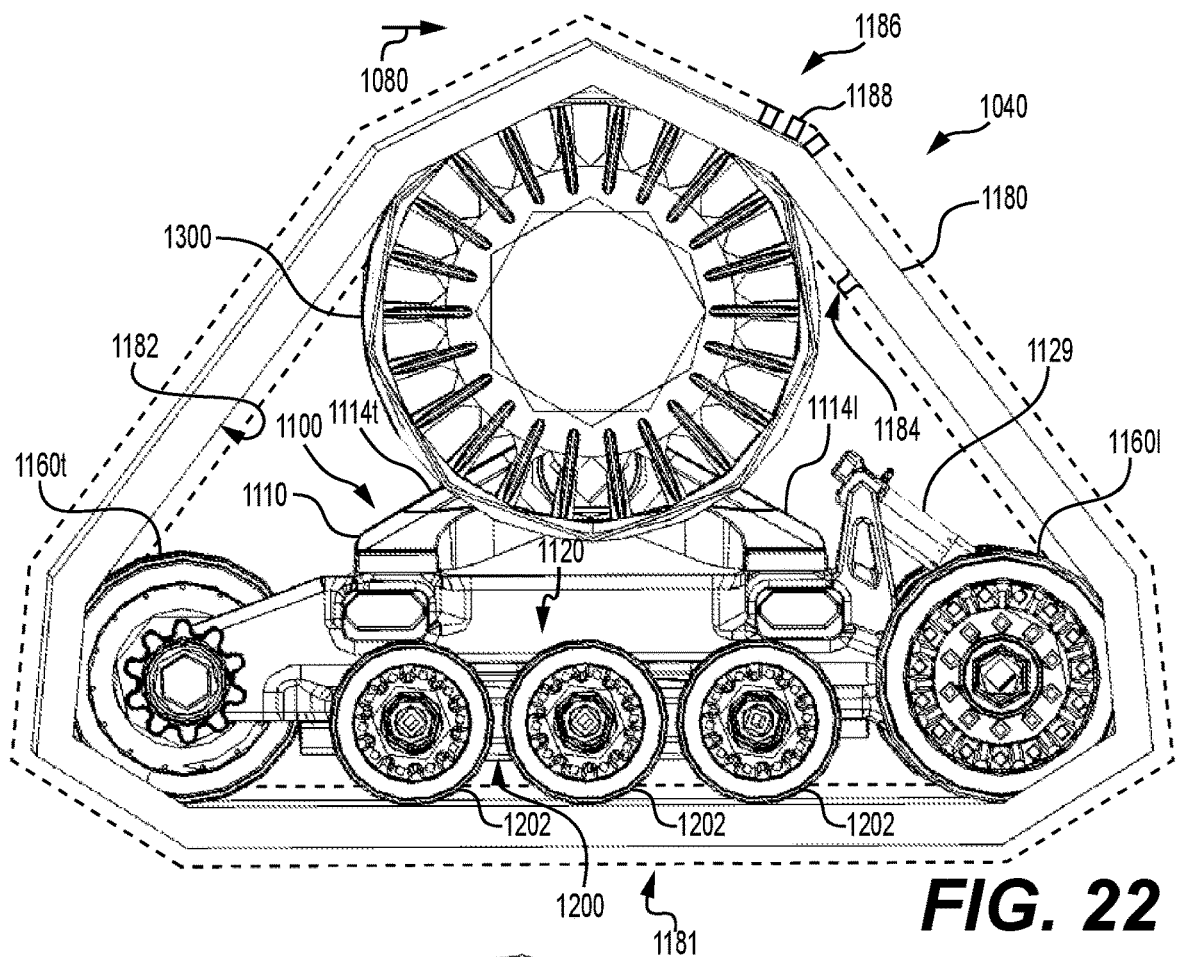
FIG. 22 is a right side elevation view of a track system having a suspended undercarriage assembly according to another embodiment of the present technology.
Figure 23:
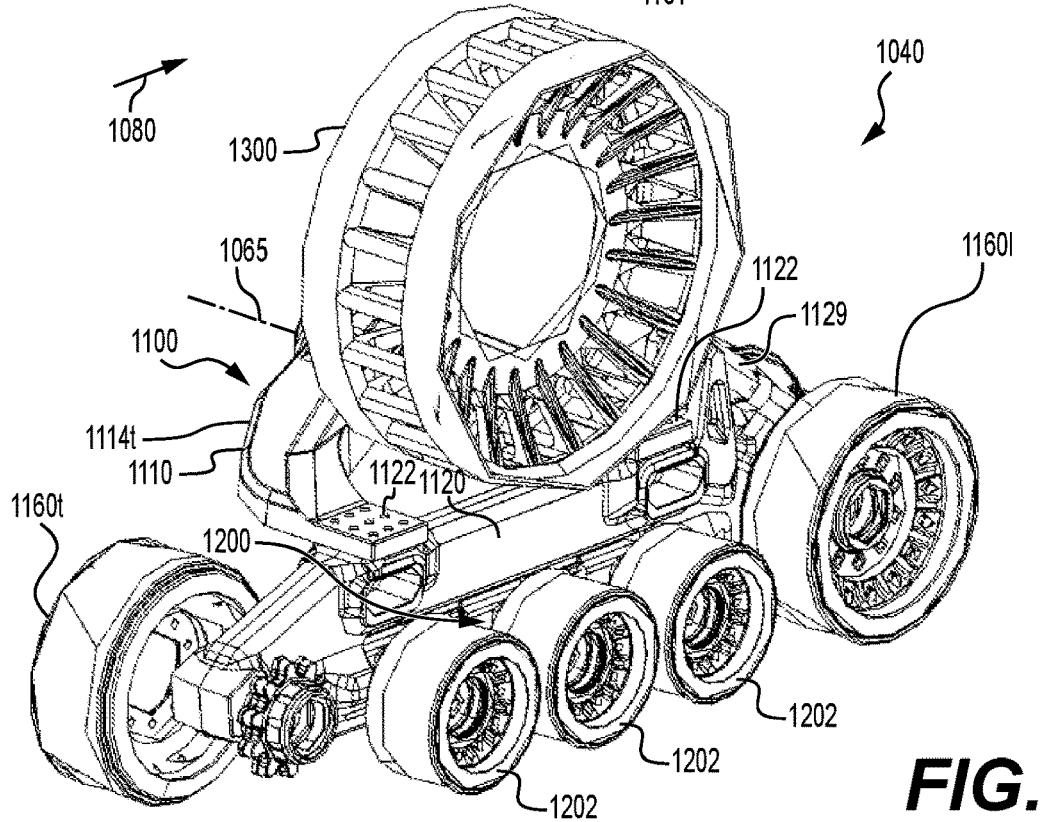
FIG. 23 is a perspective view taken from a top, rear, right side of the track system of FIG. 22, with the endless track and one trailing idler wheel removed.
Figure 24:
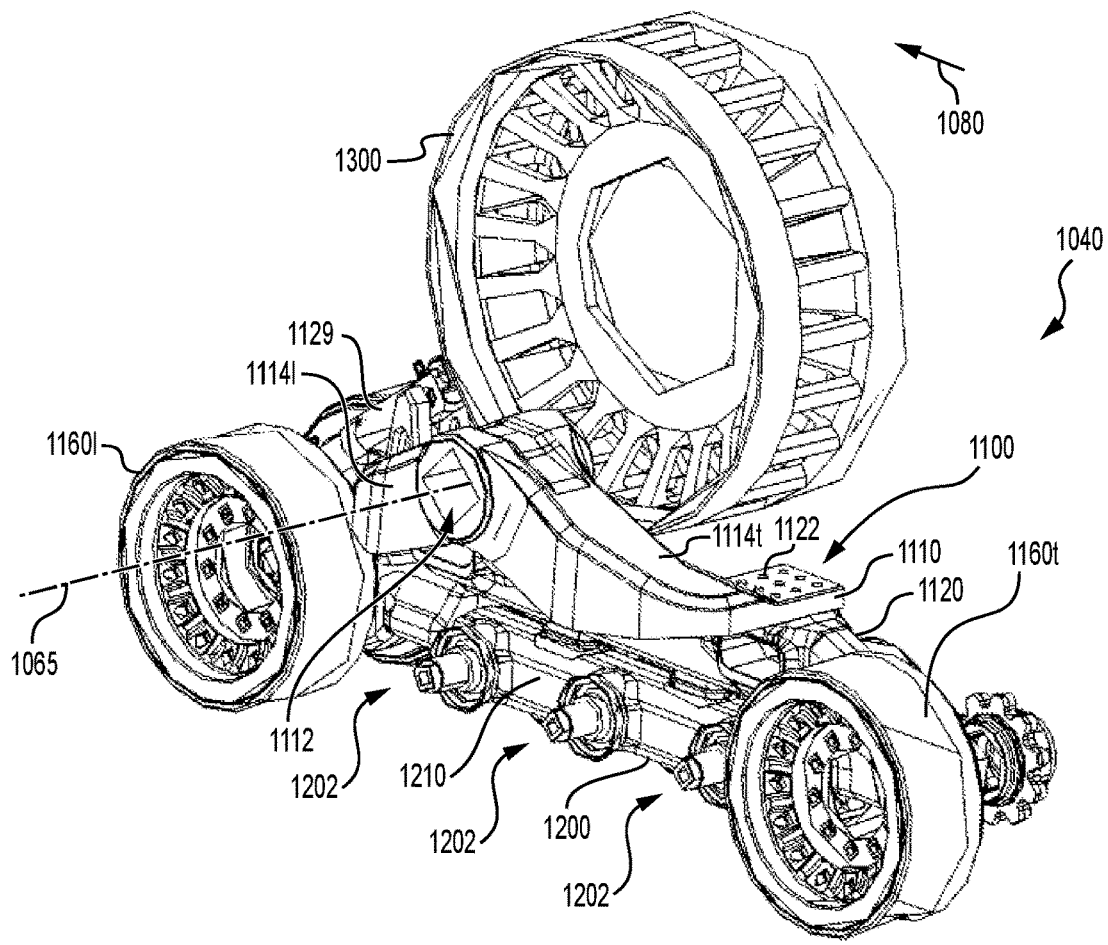
FIG. 24 is a perspective view taken from a top, front, left side of the track system of FIG. 22, with the endless track and the support wheels removed.
Figure 25:
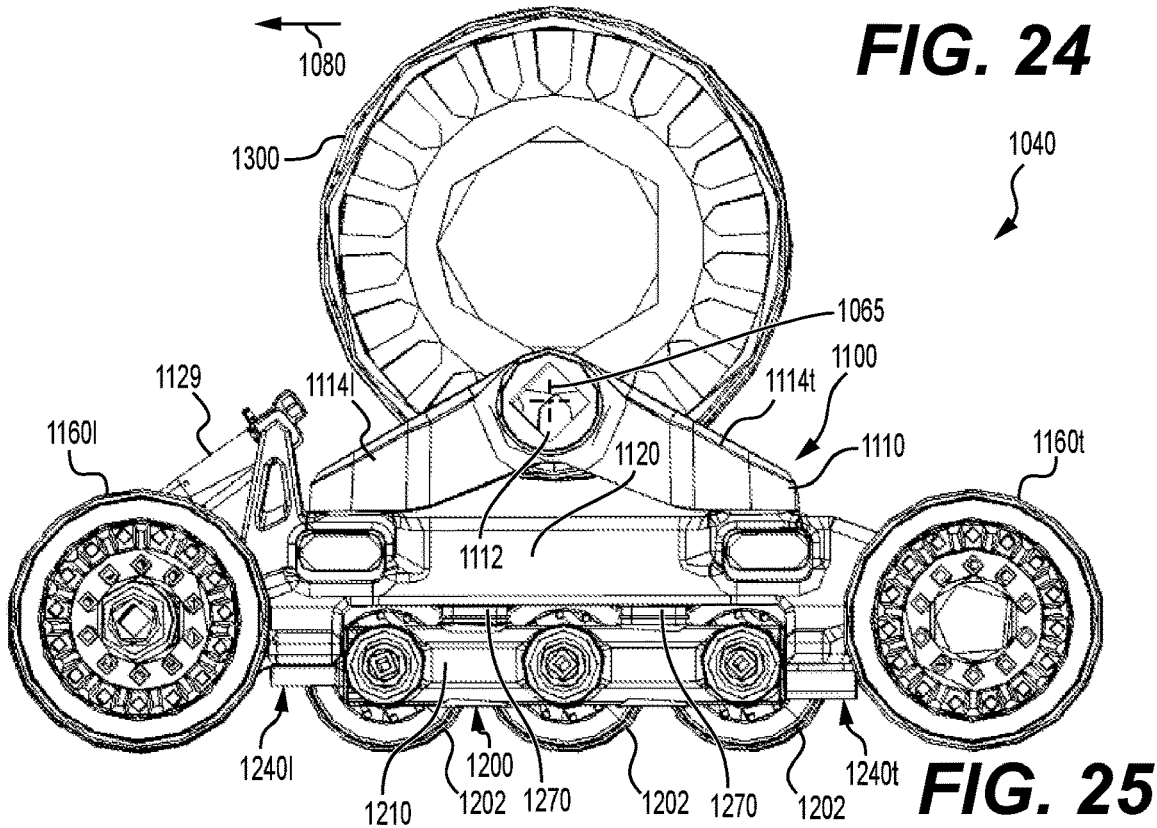
FIG. 25 is a left side elevation view of the track system of FIG. 24.
Figure 26:
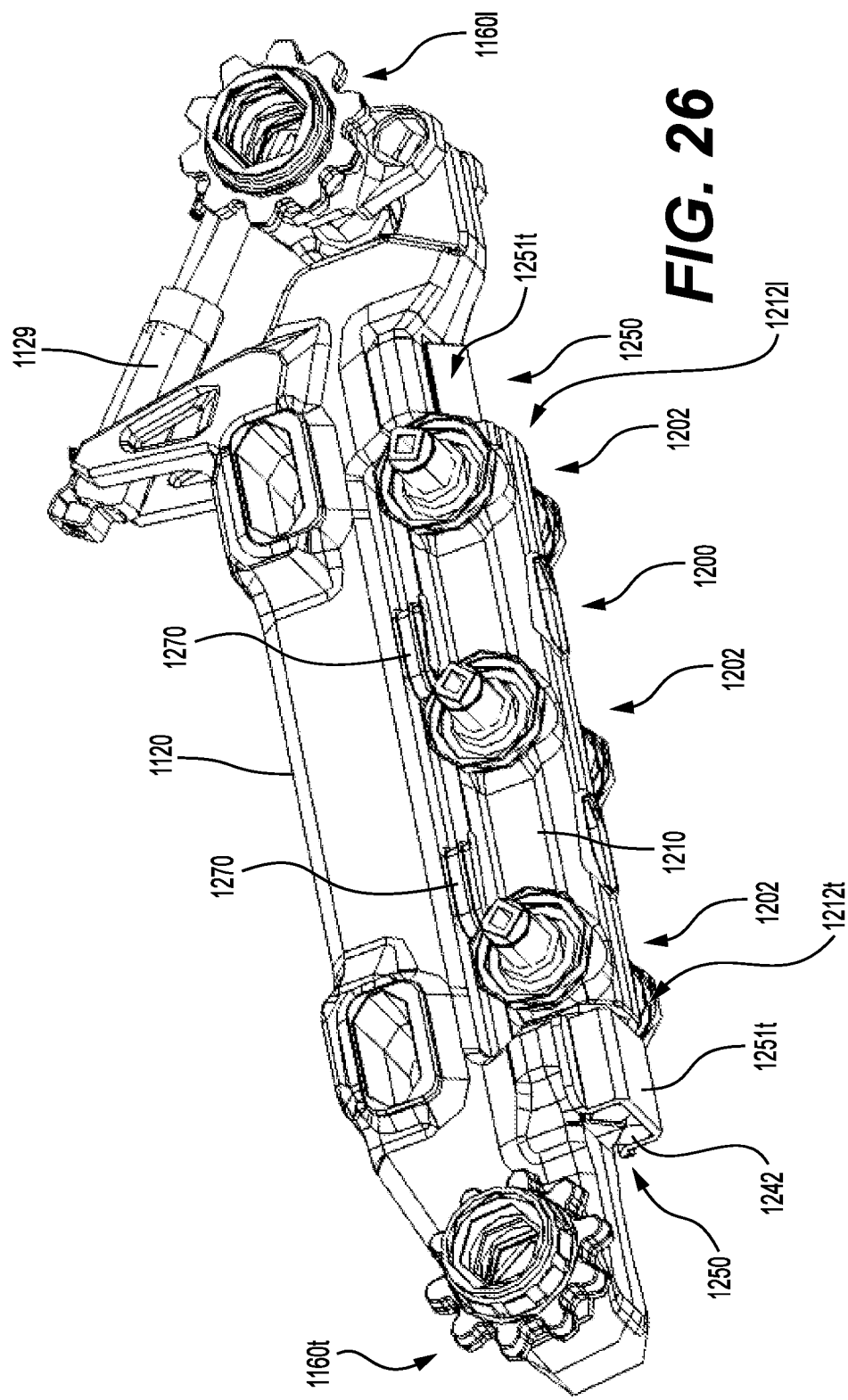
FIG. 26 is a perspective view taken from a bottom, rear, right side of a secondary frame member and the suspended undercarriage assembly of the track system of FIG. 22, with the idler wheels and the support wheels removed.
Figure 27:
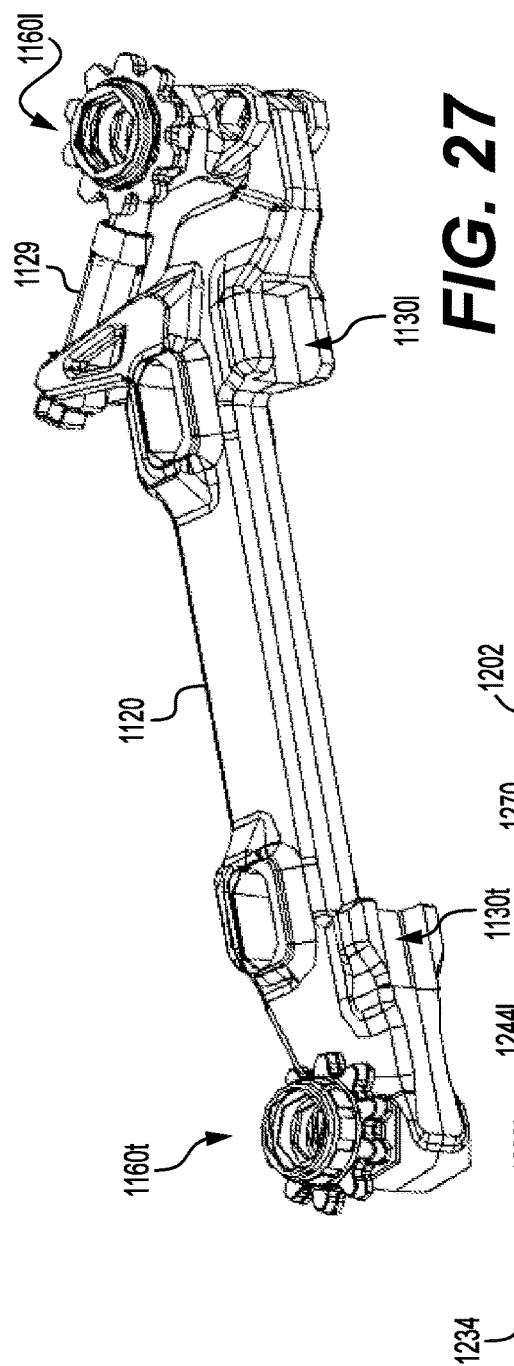
FIG. 27 is a perspective view taken from a bottom, rear, right side of the secondary frame member of FIG. 26.

Referring to FIGS. 13 to 15, the suspended undercarriage assembly 200 includes a beam 210. In present embodiment, the beam 210 is a standard channel having a rectangular profile. Using such standard component assists in reducing the overall costs of the track system 40. In some embodiments, other channels and/or profiles can be used depending on requirements. The beam 210 has leading and trailing portions 2121, 212t. The beam 210 has apertures 214 (FIGS. 19 and 20) defined therein for receiving the support wheel assemblies 202. More particularly, each support wheel assembly 202 has an axle casing 216 that is received in the corresponding aperture 214 and connected to the beam 210, and an axle 218 is rotatably connected to each of the axle casings 216. Each axle 218 supports the inward and outward support wheels 222 of each support wheel assembly 202. Each axle 218 defines a wheel axis 220 about which each of the support wheels 222 rotates. It is to be noted that when the suspended undercarriage assembly 200 is connected to the multi-member frame assembly 100 and when the track system 40 is at the rest position, the pivot axis 65 is longitudinally offset from any one of the support wheel axes 220. This feature may assist in reducing the vertical displacement undergone by the chassis 62 of the vehicle 60 when travelling on uneven terrain under certain conditions, and/or reduce the tendency of any one of the support wheel assembly 202 of oscillating laterally when the track system 40 travels. In some embodiments, a pair of support wheel assemblies 202 are configured in a tandem assembly and pivotally connected to the beam 210. As such, other configurations of the support wheel assemblies 202 than the one shown in the Figures are contemplated.

Referring to FIG. 16, a leading plate 2301 is connected to the leading portion 2121 of the beam 210, and has a leading pin 2321 projecting therefrom. Similarly, a trailing plate 230t is connected to the trailing portion 212t of the beam 210, and has a trailing pin 232t projecting therefrom. The pins 2321, 232t are cylindrical, but could be shaped otherwise in other embodiments such as to define a flat section or a keyway. The pins 2321, 232t collectively define an undercarriage pivot axis 234 extending longitudinally. In present embodiment, the pins 2321, 232t are machined in the corresponding plates 2301, 230t. In some embodiments, the pins 2321, 232t are integrally formed with the beam 210.

Referring to FIGS. 13 to 19, the suspended undercarriage assembly 200 further includes leading and trailing bushing assemblies 240l, 240t. As the leading and trailing bushing assemblies 240l, 240t are similarly structured, only the leading bushing assembly 240l will be described and the description related to the leading bushing assembly 240l apply to the trailing bushing assembly 240t.

The leading bushing assembly 240l is connected to the leading portion 2121 of the beam 210 via the leading pin 2321. The leading bushing assembly 240l has a resilient bushing 242. The bushing 242 is made of a resilient material, selected from, for example, an elastomer, a rubber- or a silicon-based material. In the present embodiment, the bushing 242 is structured and dimensioned to promote a greater deformation of the bushing 242 in the vertical direction than in the lateral direction. The bushing 242 defines an aperture 244 (FIGS. 17 and 18) having a cylindrical shape. The aperture 244 is dimensioned and structured to connect to the leading pin 2321 upon insertion therein. In the present embodiment, a sleeve 246 is disposed in the aperture 244 and extends between the bushing 242 and the leading pin 2321. The sleeve 246 is connected to the bushing 242 and is prevented from rotating or sliding with respect to the bushing 242. The sleeve 246 is configured for connecting to the leading pin 2321 by press-fit connection. It is contemplated that the sleeve 246 could be omitted and/or that other connection methods be used in other embodiments.

When the leading pin 2321 is connected to the bushing 242, the beam 210 is connected to the leading bushing assembly 240l, and pivotal and translational movements of the pin 2321 (as the support wheel assemblies 202 engage the ground-engaging segment 181 of the endless track 180) are communicated to the bushing 242. A opening 248, best seen in FIG. 17, is defined in the bushing 242 below the aperture 244. The opening 248 is shaped and dimensioned for varying the compressibility of the bushing 242 in the vertical direction, and thus promote the deformation of the bushing 242 in the vertical direction. In some embodiments, the opening 248 is shaped and dimensioned for varying the compressibility of the bushing 242 in the vertical and/or lateral directions.

More particularly, the opening 248 renders the lower portion of the bushing 242 more compliant than the upper portion, which causes the bushing 242 to resiliently deform by a greater amount in the lower portion compared to the upper portion thereof for equal stresses applied thereto. Furthermore, the opening 248 causes a reduction of the shear stress induced in the bushing 242 when deforming in the lateral directions. This feature thus promotes a greater durability of the bushing 242. This reduction of shear stress in the bushing 242 also reduces the possibilities for debris to enter between the bushing 242 and a bushing housing 250, which will be described in further detail below.

As best seen in FIG. 17, the opening 248 is shaped as a rectangle with rounded corners 248a. A radius of the corners 248a of the opening 248 is selected to decrease stress concentration in these regions of the bushing 242. The opening 248 further has a width 248b that is about equal to the diameter of the aperture 244. By about equal, it is understood that the width 238b is within ±20% of the diameter of the aperture 244. The width 248b of the opening 248 is selected to limit translation movements of the pin 2321 in the lateral directions while allowing the pivoting of the pin 2321 about the longitudinally extending undercarriage pivot axis 234. Other shapes of the opening 248 are contemplated.

Furthermore, the opening 248 has a height 248c selected to enable the bushing 242 to be compliant by a predetermined amount in the vertical direction. Thus, should more compliance in the vertical direction be desired, the height 248c of the opening 248 could be increased. In addition, the opening 248 is a through hole defined in the bushing 242, but could be a bore hole in some embodiments. Caps or covers could be connected to the bushing 242 to prevent debris from entering the opening 248. Moreover, it is contemplated that other configurations of the opening 248 could include a) two aligned bore holes with a wall of the material forming the bushing 242 extending therebetween, b) one bore hole extending from the hidden face of the bushing 242 (facing the plate 2301) until a region in the bushing 242 extending behind the exposed face of the bushing 242, thus leaving a wall of material of the bushing 242 preventing the introduction of debris in the opening 248, or c) the opening 248 could be defined in the bottom face of the bushing 242 and extend vertically up to below the sleeve 246.

It is to be noted that should the opening 248 be disposed above the sleeve 246 (and the pin 2321), the bushing 242 would deform by an undesirable amount as not enough polymeric material of the bushing 242 would remain to withstand the stresses. In addition, should openings be defined on either side of the sleeve 246, the deformation of the polymeric material forming the bushing 242 in the lateral directions would be too great and the deformation in the vertical direction would be too limited, at least in some circumstances. Thus, the selection of the positioning, size and configuration of the opening 248 is made with these considerations and in view of the design specifications desired for the suspended undercarriage assembly 200.

Referring to FIGS. 10A to 19, the leading bushing assembly 240*l* further has the bushing housing 250 made of a metallic material, such as steel. The bushing housing 250 is fixedly connected to the top, bottom, inward and outward faces of the bushing 242. The bushing 242 is maintained in a pre-stressed condition (under compression) within the bushing housing 250 in order to increase the durability thereof as crack propagation is mitigated when the material forming the bushing 242 is under compression. The bushing housing 250 has a lateral cross-section 252 that is complementary to the profile 132 of the leading recess 1301 (FIG. 11). More particularly, the profile 252 of the bushing housing 250 has a generally rectangular shape, with shoulders 254 defined on the vertically extending sides of the profile 252, the shoulders 254 projecting laterally from the vertically extending sides of the profile 252. The shoulders 254 are structured and dimensioned to engage the shoulders 134 defined in the leading recess 1301. The bushing housing 250 is slidably insertable in the leading recess 1301 from the region extending between the leading and trailing secondary frame members 120*l*, 120*t*. When the bushing housing 250 is slidably engaged in the leading recess 130, the bushing housing 250 is retained in the leading recess 240*l* and can only slide longitudinally. It is to be noted that the engagement of the shoulders 134, 254 prevents the bushing housing 250 from falling out of the leading recess 240*l*. It is contemplated that the bushing housing 250 could be further connected to the leading frame member 1601 using fasteners, or any suitable bonding technique. The bushing housing 250 of each of the leading and trailing bushing assemblies 240*l*, 240*t* connect the leading and trailing bushing assemblies 240*l*, 240*t* to the secondary leading and trailing frame members 1601, 160*t* respectively.

Referring to FIGS. 9 to 13, when track system 40 travels over a laterally slopped terrain, such as a road having a crown, the support wheel assemblies 202 and the beam 210 pivot about the undercarriage pivot axis 234. In other words, the support wheel assemblies 202 are capable of roll motion relative to the multi-member frame assembly 100, as shown in FIGS. 10B and 10C. When the support wheel assemblies 202 and the beam 210 pivot about the undercarriage pivot axis 234, the leading pin 2321 and the trailing pin 232*t* also pivot about the undercarriage pivot axis 234 and cause the bushings 242 of the leading and trailing bushing assemblies 240*l*, 240*t* to resiliently deform in the lateral directions. In other words, the bushings 242 are resiliently deformed circumferentially about the undercarriage pivot axis 234 (FIG. 11). The bushings 242 are structured to permit movement of the beam 210 relative to the multi-member frame assembly 100 in a predetermined range. The bushings 242 also resiliently bias the beam 210 towards the rest position (FIG. 10A) with respect to the multi-member frame assembly 100. In the present embodiment, the support wheel assemblies 202 and the beam 210 are capable of roll motion by an angle ranging between about −5 to +5 degrees relative to the multi-member frame assembly 100. In FIG. 10B, it is shown that the support wheel axis 220 is moved by angle α between the rest position corresponding to a rotation about the undercarriage pivot axis 234 of 0 degree and a position 220' corresponding to a rotation about the undercarriage pivot axis 234 of 5 degrees in a first direction. In FIG. 10C, it is shown that the support wheel axis 220 is moved by angle α' between the rest position and a position 220" corresponding to a rotation about the undercarriage pivot axis 234 of 5 degrees in a second direction. Other ranges of angle are contemplated in other embodiments.

Furthermore, when the track system 40 travels over a bump or into a hole, the support wheel assemblies 202 and the beam 210 can move vertically, and the leading and trailing pins 2321, 232*t* also move vertically and cause the bushings 242 of the leading and trailing bushing assemblies 240*l*, 240*t* to resiliently deform in the vertical direction about the undercarriage pivot axis 234. In other words, the bushings 242 are resiliently deformed radially about the undercarriage pivot axis 234. The vertical displacement of the support wheel assemblies 202 and the beam 210 is permitted by the deformation of the bushings 242 which absorb at least a portion of the impact induced by the bump or hole over which the track system 40 travels. The bushings 242 thus provide some damping of the suspended undercarriage assembly 200 relative to the multi-member frame assembly 100.

The suspended undercarriage assembly 200 thus enables the endless track 180 to better conform to the terrain on which the track system 40 travels, and that at least over the portion of the ground-engaging segment 181 of the track 180 that extends underneath the support wheel assemblies 202.

In some embodiments, the axles casings 216 of the support wheel assemblies 202 are resiliently connected to the beam 210. For example, a rubber bushing (not shown) could be provided between the each of the axles casings 216 and the beam 210. Thus, the support wheel assemblies 202 are capable of additional vertical and lateral motions that are independent of the vertical and lateral motions of the beam 210 relative to the multi-member frame assembly 100.

In some embodiments, only one resilient bushing assembly is connected to the beam 210 at one of the leading and trailing portions 2121, 212*t* thereof, while the other of the leading and trailing portions 2121, 212*t* of the beam 210 is pivotally connected to the multi-member frame assembly 100. In other embodiments, the bushing assemblies 240*l*, 240*t* include one or more other devices capable of resilient deformation, such as a coil spring, a shock absorber, a leaf spring, a balloon, a compliant mechanism, etc.

Figure 28:
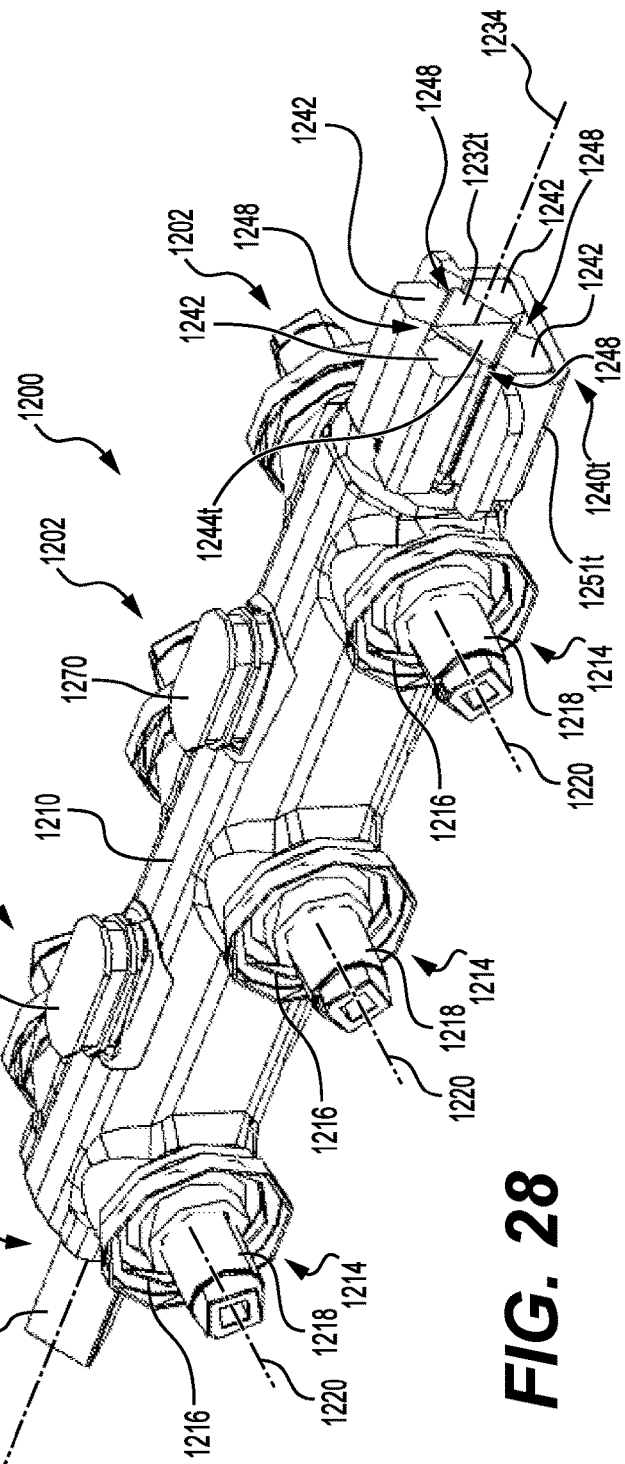
FIG. 28 is a perspective view taken from a top, front, right side of the suspended undercarriage assembly of the track system of FIG. 26.
Figures 29, 30:
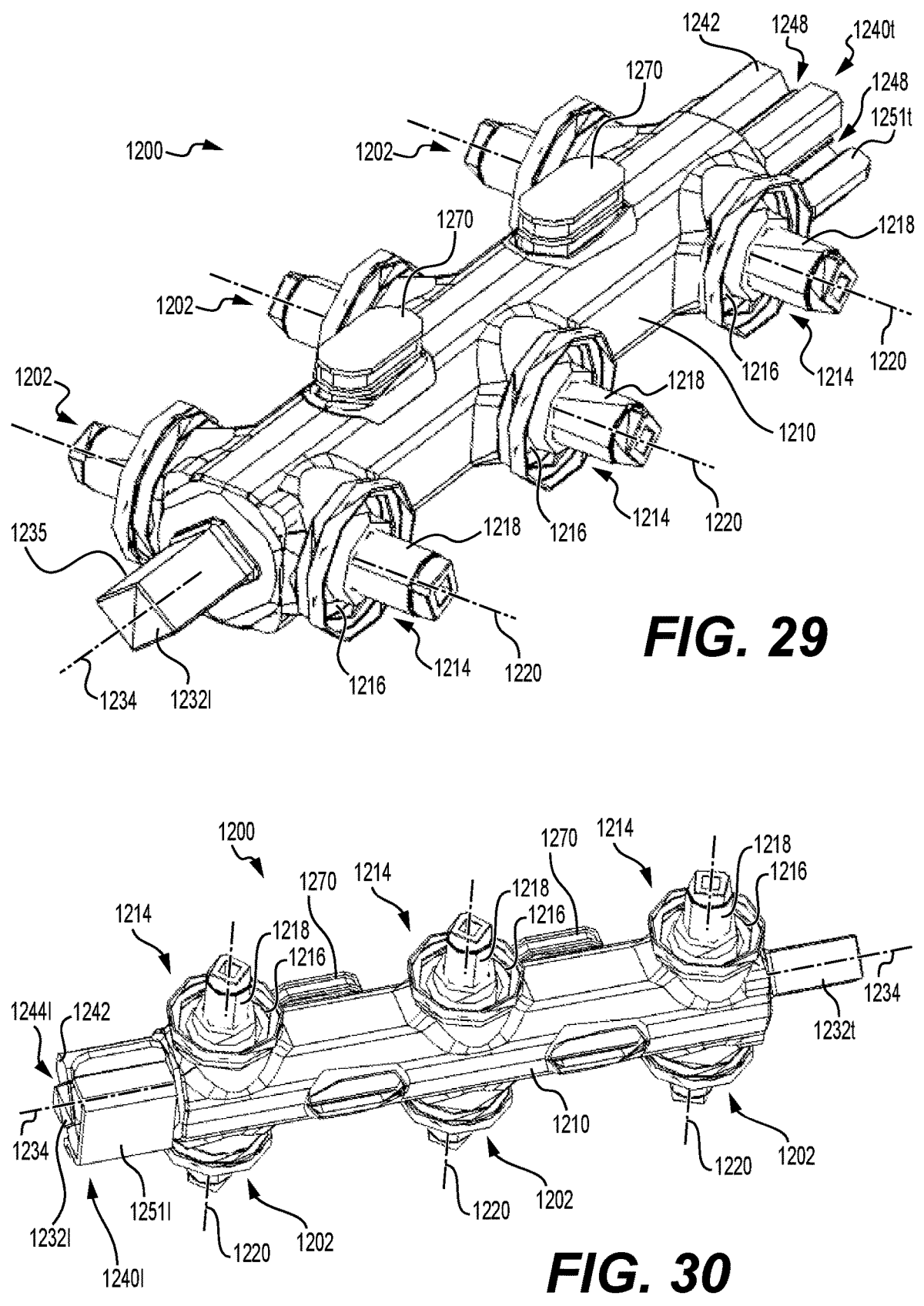

Turning now to FIGS. 22 to 30, the track system 1040 will now be described. The track system 1040 has a multi-member frame assembly 1100 that includes a single secondary frame member 1120. The secondary frame member 1120 defines leading and trailing recesses 11301, 1130t adapted to receive leading and trailing portions of the suspended undercarriage assembly 1200. Referring to FIGS. 28 to 30, the suspended undercarriage assembly 1200 has a beam 1210 that supports the support wheel assemblies 1202 of the track system 1040. Leading and trailing pins 12321, 1232t project longitudinally from the beam 1210 and collectively define the undercarriage pivot axis 1234. The leading and trailing pins 12321, 1232t have a diamond-shape cross-section 1235. The shape of the cross-section 1235 of the leading and trailing pins 12321, 1232t is selected so as to promote movement of the beam 1210 relative to the multi-member frame assembly 1100 into predetermined directions and to a predetermined degree. For example, the shape of the cross-section 1235 can be selected in order to have different range of motion in vertical and lateral directions for instance. Other shapes of the cross-section of the leading and trailing pins 12321, 1232t are contemplated, such as square, rectangular and triangular shapes.

The beam 1210 is connected to the secondary frame member 1120 via leading and trailing bushing assemblies 1240l, 1240t. Each bushing assembly 1240l, 1240t includes a rectangular housing 1250 defined in part by the corresponding recess 11301, 1130t defined in the secondary frame member 1120 and by a corresponding housing plate 12511, 1251t. The housing plates 12511, 1251t connect to the secondary frame member 1120 via fasteners (not shown). In each of the leading and trailing bushing assembles 1240l, 1240t, four bushings 1242 are seated in the corners of the rectangular housing 1250 and are propped against the rectangular housing 1250 by the corresponding leading and trailing pin 12321, 1232t. The four bushings 1242 of the leading bushing assembly 1240l define the aperture 12441 (FIG. 30) adapted for receiving the leading pin 12321. Similarly, the four bushings 1242 of the trailing bushing assembly 1240t define the aperture 1244t (FIG. 28) adapted for receiving the trailing pin 1232t. Four openings 1248 are defined between pairs of adjacent bushings 1242. The openings 1248 are shaped and dimensioned by selecting the shape and dimension of the bushings 242, and the openings 1248 permit varying the compressibility of the bushing assemblies 1240l, 1240t.

When the support wheel assemblies 1202 and the beam 1210 pivot about the undercarriage pivot axis 1234 and/or move vertically relative to the multi-member frame assembly 1100, the leading pin 12321 and the trailing pin 1232t also pivot about the undercarriage pivot axis 1234 and cause the bushings 1242 of the leading and trailing bushing assemblies 1240l, 1240t to resiliently deform. The bushings 1242 and the cross-section 1235 of the leading and trailing pins 12321, 1232t are selected to permit a certain range of movement of the beam 1210 relative to the multi-member frame assembly 1100. The bushings 1242 also resiliently bias the beam 1210 towards the rest position with respect to the multi-member frame assembly 1100. In some embodiments, the bushings 1242 can have different shape and rigidity between one another to modulate the deformation behavior of the bushing assemblies 1240l, 1240t. For example, in some embodiments, some of the bushings 1242 have an open section shaped to promote deformation in the vertical direction.

Referring to FIG. 28, two resilient pads 1270 are also connected to the beam 1210 and configured to engage the multi-member frame assembly 1100. In some embodiments, the resilient pads 1270 are a stack of elastomeric layers having differing characteristics. The pads 1270 abut the secondary frame member 1120 and are structured to resiliently deform when the track system 1040 travels over an uneven terrain. The two resilient pads 1270 collaboratively absorb shocks and vibrations with the leading and trailing bushing assembles 1240l, 1240t. The resilient pads 1270 thus act as suspension elements. The resilient pads 1270 further assist in dampening vibrations undergone by the suspended undercarriage assembly 1200, and assist in reducing the amount of vibrations transferred from the track system 1040 to the chassis 62 of the vehicle 60. It is contemplated that more or less than two resilient pads 1270 could be connected to the beam 1210 in other embodiments, and that the resilient pads 1270 could be omitted in some embodiments.

Figure 31:
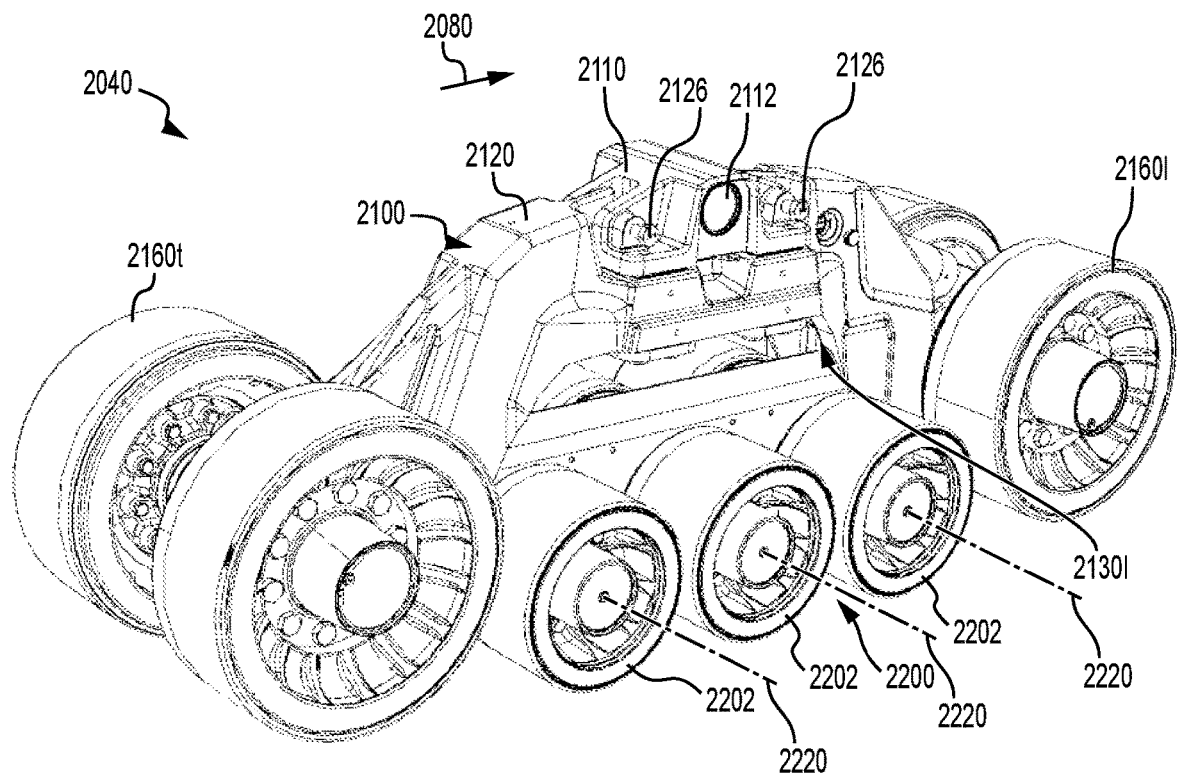
FIG. 31 is a perspective view taken from a top, rear, right side of a track system having a suspended undercarriage assembly according to yet another embodiment of the present technology, with the sprocket wheel and the endless track omitted.
Figure 32:
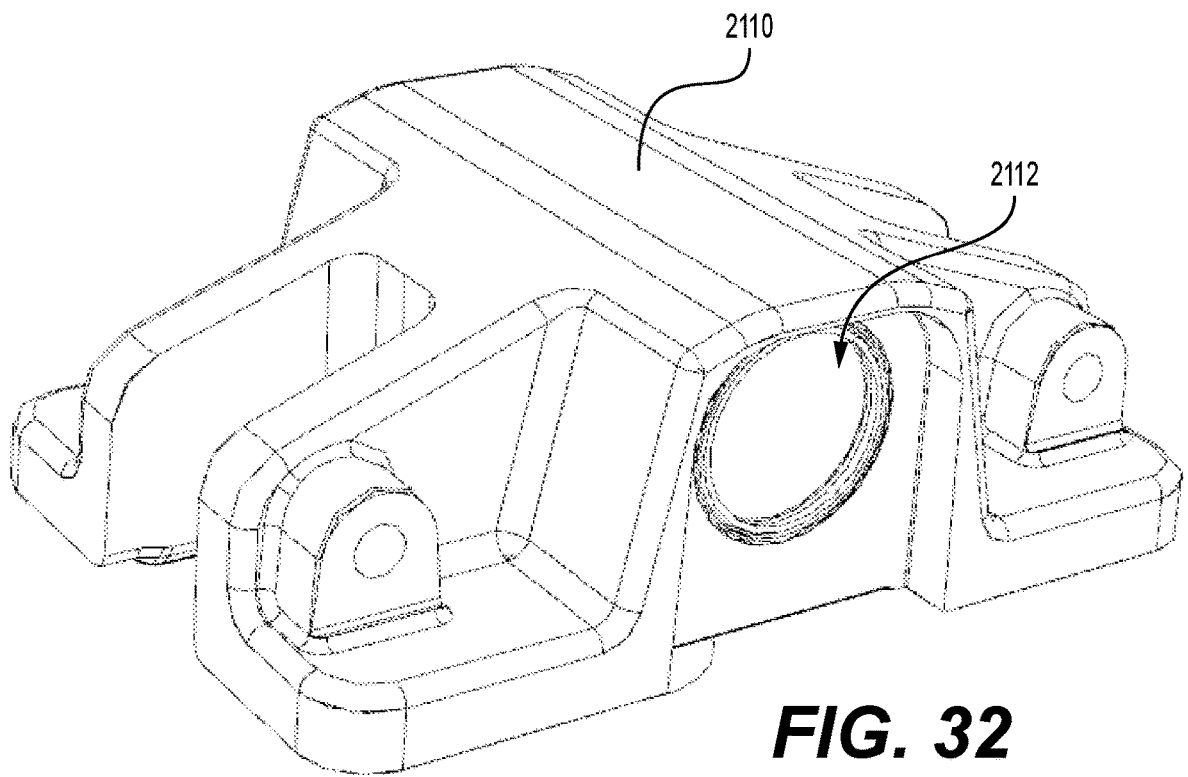
FIG. 32 is a perspective view taken from a top, rear, right side of a primary frame member of the track system of FIG. 31.
Figure 33:
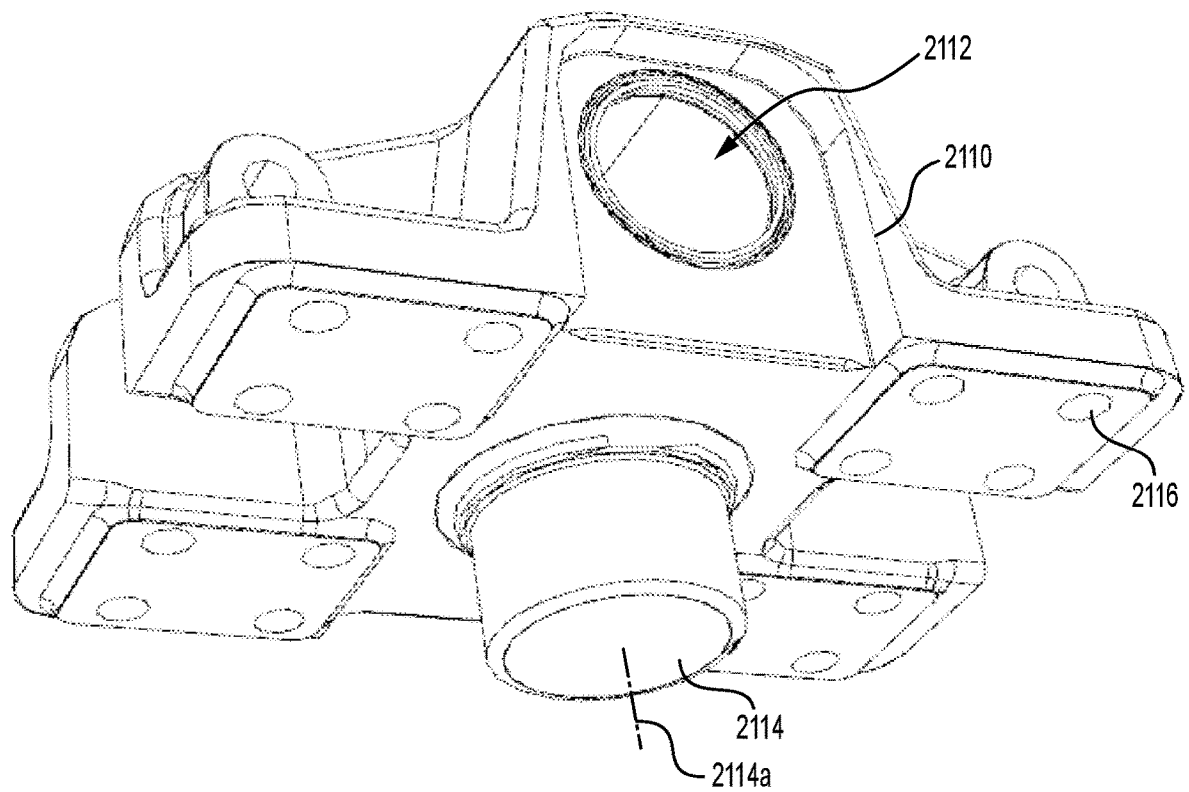
FIG. 33 is a perspective view taken from a bottom, rear, right side of the primary frame member of FIG. 32.
Figure 34:
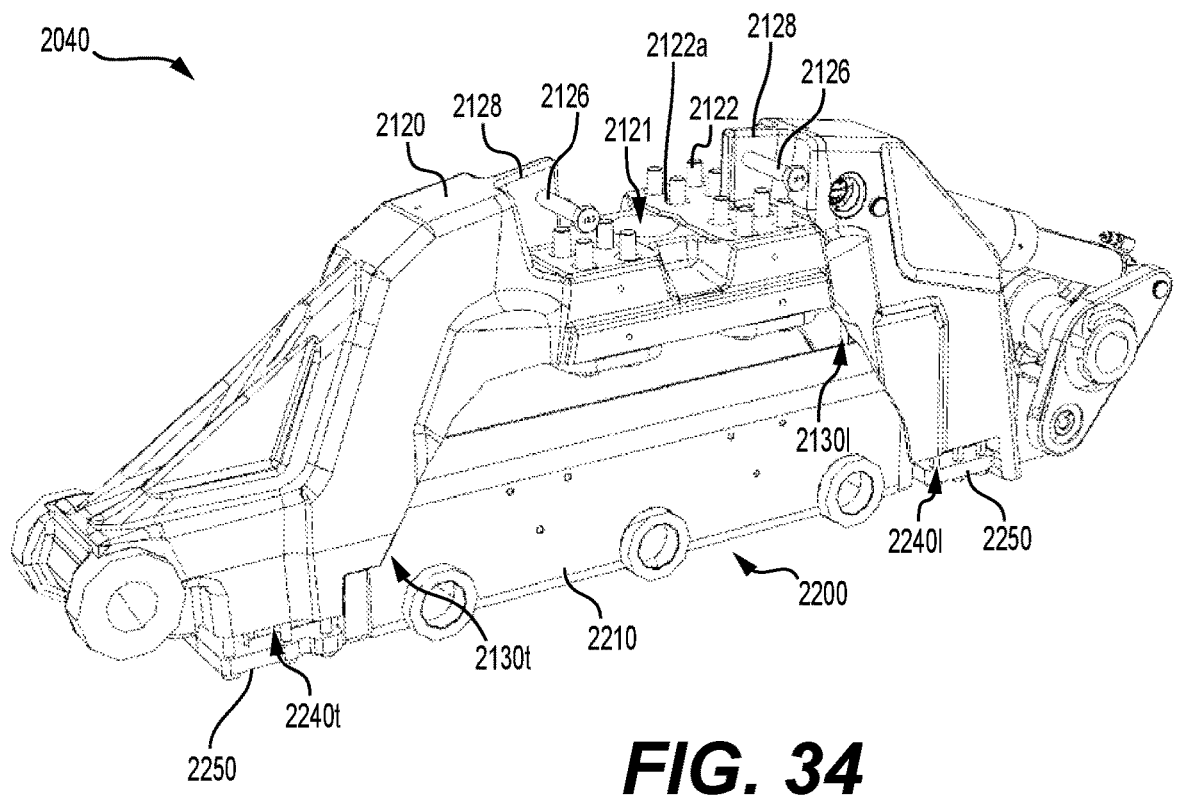
FIG. 34 is a perspective view taken from a top, rear, right side of a secondary frame member and the suspended undercarriage assembly of the track system system of FIG. 31, with the wheels omitted.
Figure 35:
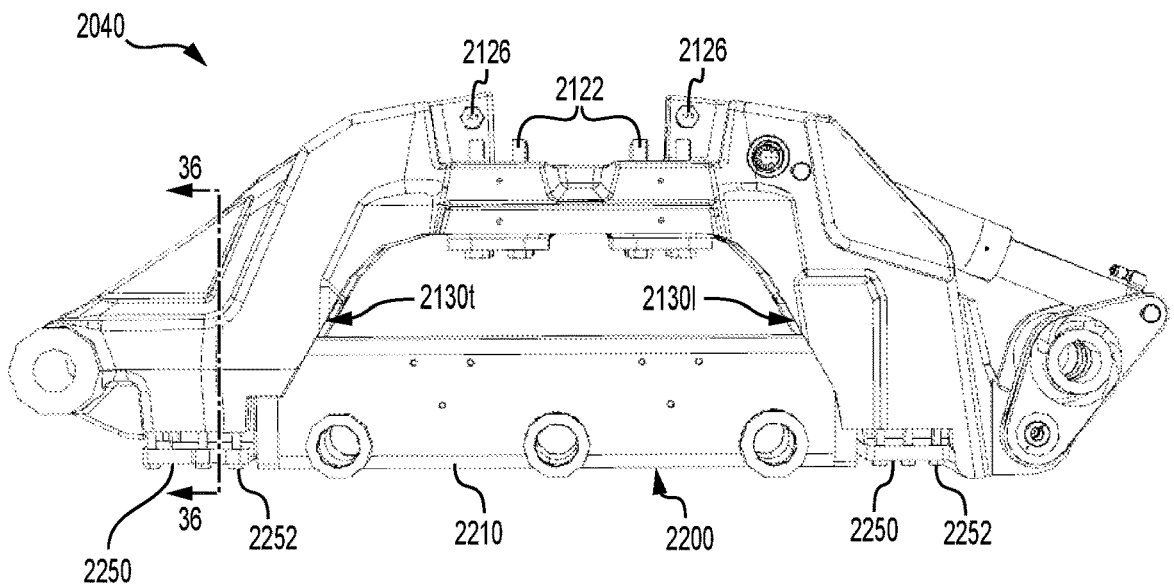
FIG. 35 is a right side elevation view of the secondary frame member and the suspended undercarriage assembly of FIG. 34.

Turning now to FIGS. 31 to 39, the track system 2040 will be described. The track system 2040 also has a multi-member frame assembly 2100 that has a primary frame member 2110 and a single secondary frame member 2120. Referring to FIGS. 31 to 33, the primary frame member 2110 has the aperture 2112 for receiving the pivot pin 64 connected to the chassis 62 of the vehicle 60. The primary frame member 2110 has a cylindrical projection 2114 (FIG. 33) projecting from the bottom face thereof. The cylindrical projection 2114 defines a pivot axis 2114a, and is adapted to be received in an aperture 2121 defined in the secondary frame member 2120. Fasteners 2122 extend through holes 2122a defined in the secondary frame member 2120 and threadably engage holes 2116 (FIG. 33) defined in the primary frame member 2110. The holes 2122a are larger than the fasteners 2122 such that the fasteners 2122 have a play when extending in the holes 2122a. When the fasteners 2122 are loosely engaged to the primary frame member 2110, adjustment bolts 2126 connected to the primary frame member 2120 selectively abut on tabs 2128 of the secondary frame member 2120 and are used to selectively pivot the secondary frame member 2120 relative to the primary frame member 2110 about the pivot axis 2114a in order to vary a yaw angle of the track system 40 relative to the chassis 62 of the vehicle 60. Once a "toe-in" or "toe-out" angle of the track system 2040 is selected, the fasteners 2122 are tightened and the primary and secondary frame members 2110, 2120 are connected together with the desired angle.

Figure 36A:
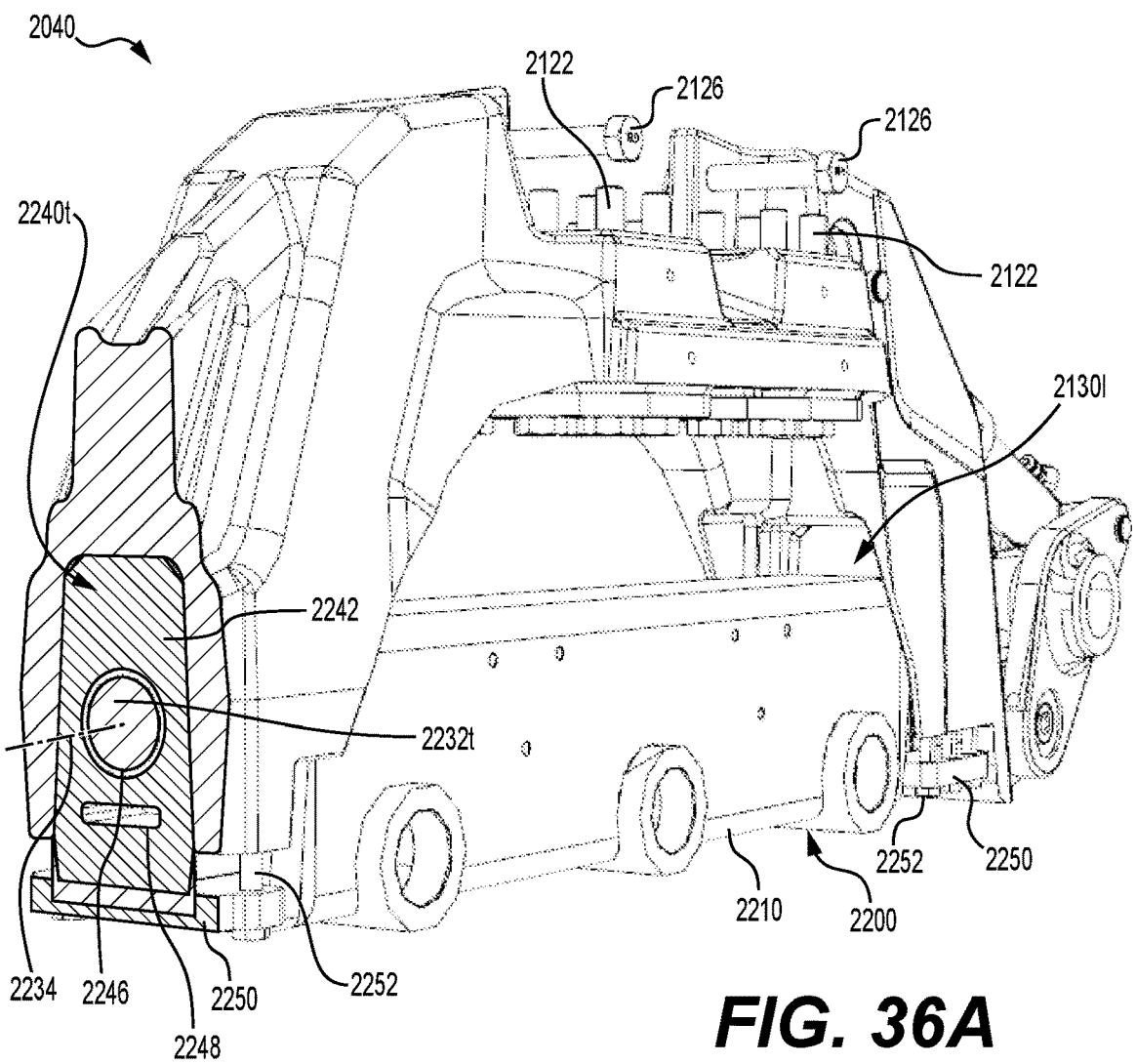
FIG. 36A is a cross-sectional, perspective view taken from a top, rear, right side of the secondary frame member and the suspended undercarriage assembly of FIG. 34 taken along cross-section line 36-36 of FIG. 35, with the support wheel assemblies in a rest position.
Figure 36B:
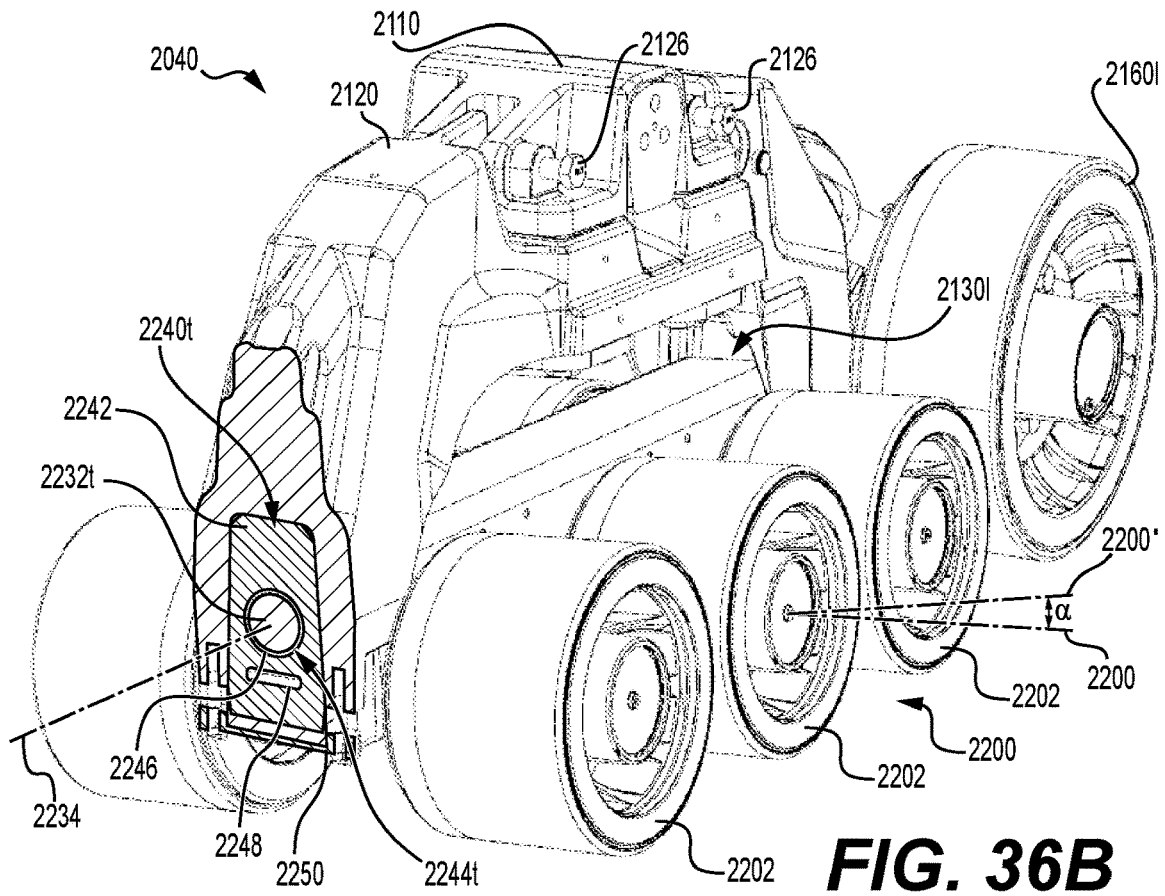
FIG. 36B is a cross-sectional, perspective view taken from a top, rear, right side of the secondary frame member and the suspended undercarriage assembly of FIG. 34 taken along cross-section line 36-36 of FIG. 35, with the wheels connected thereto and with the suspended undercarriage assembly pivoted 5 degrees in a first direction.
Figure 36C:
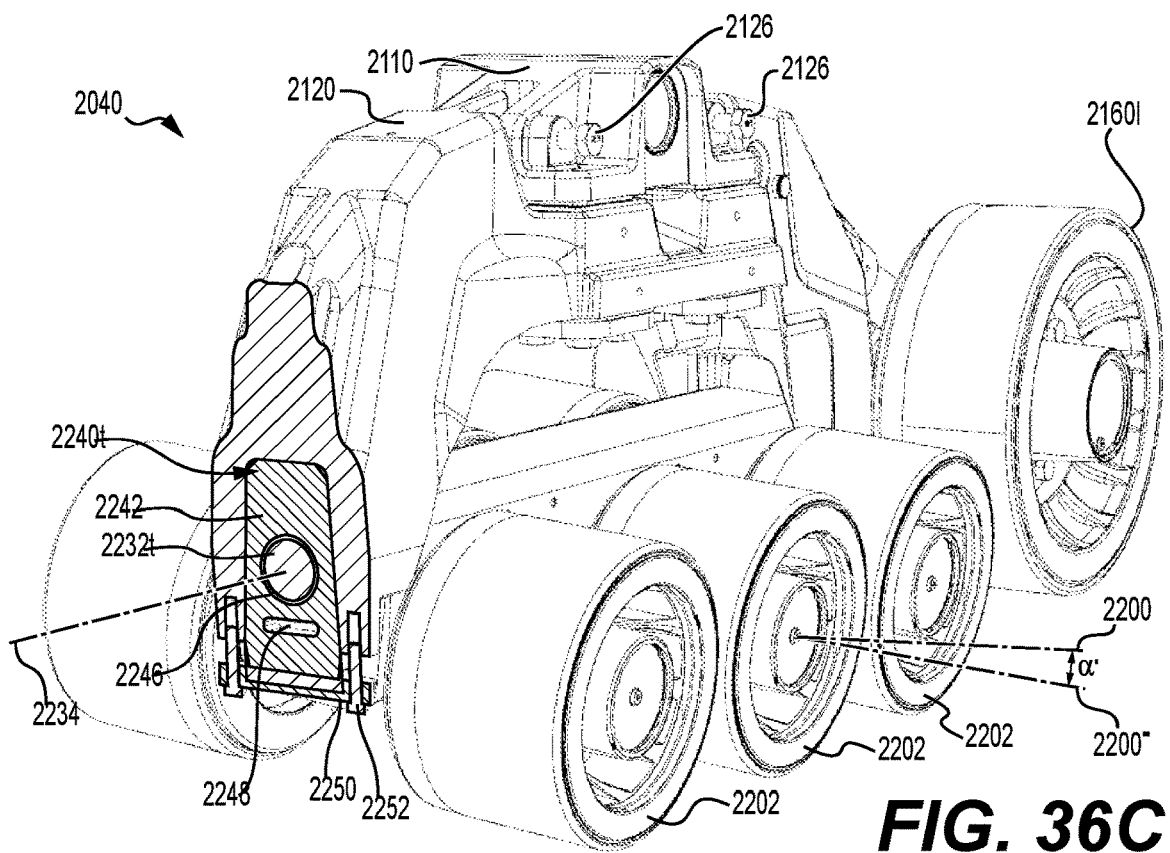
FIG. 36C is a cross-sectional, perspective view taken from a top, rear, right side of the secondary frame member and the suspended undercarriage assembly of FIG. 34 taken along cross-section line 36-36 of FIG. 35, with the wheels connected thereto and with the suspended undercarriage assembly pivoted 5 degrees in a second direction.
Figure 37:
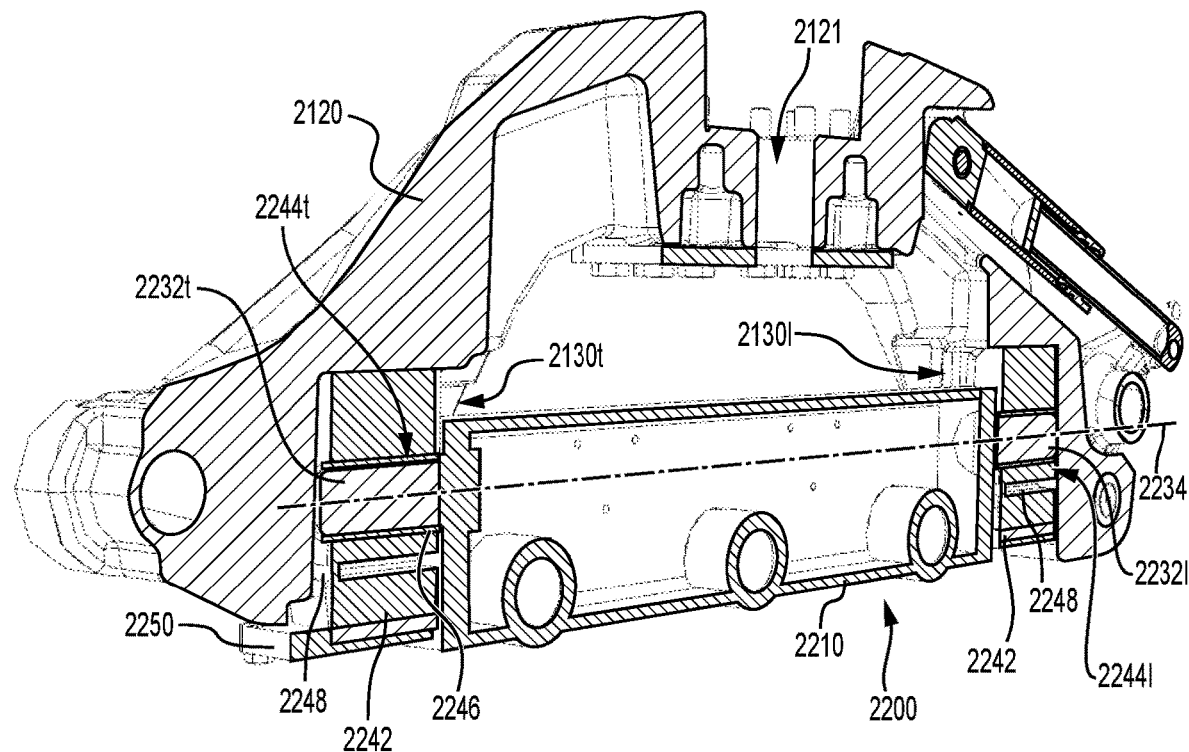
FIG. 37 is a cross-sectional, perspective view taken from a rear, right side of the secondary frame member and suspended undercarriage assembly of FIG. 34 taken along a longitudinal center plane thereof.
Figure 38:
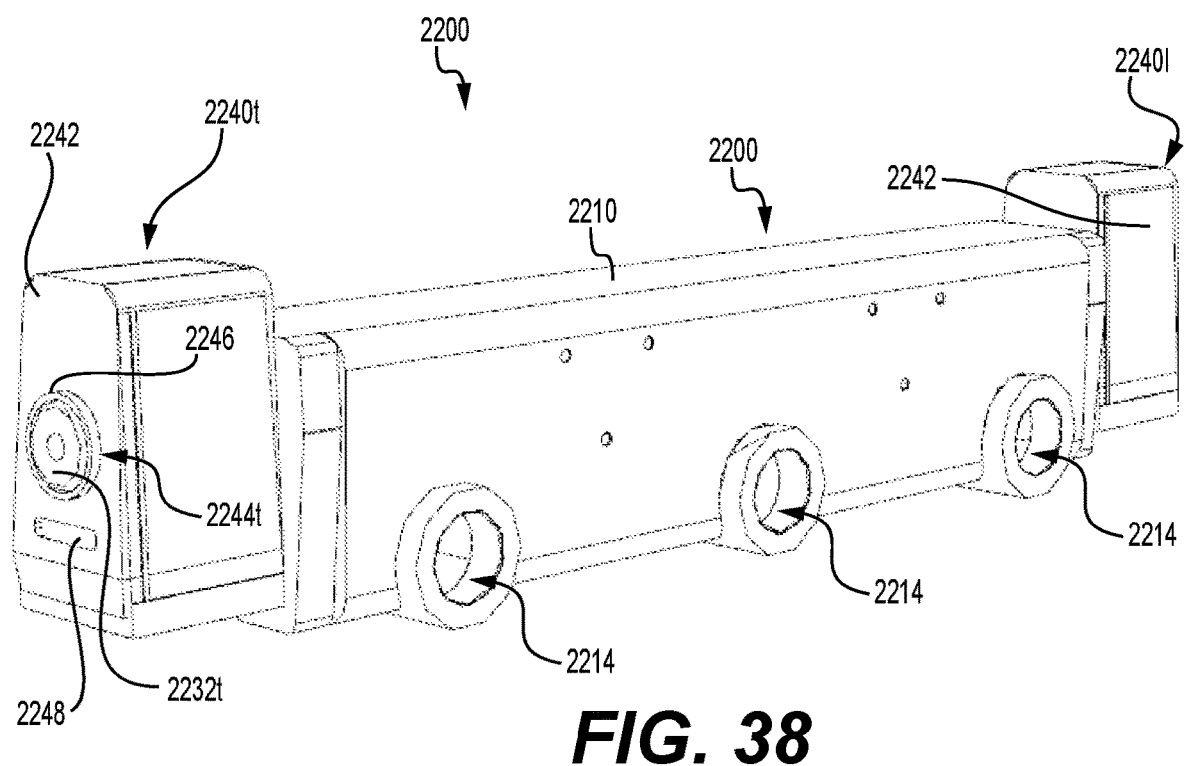
FIG. 38 is a perspective view taken from a top, rear, right side of the suspended undercarriage assembly of FIG. 34.
Figure 39:
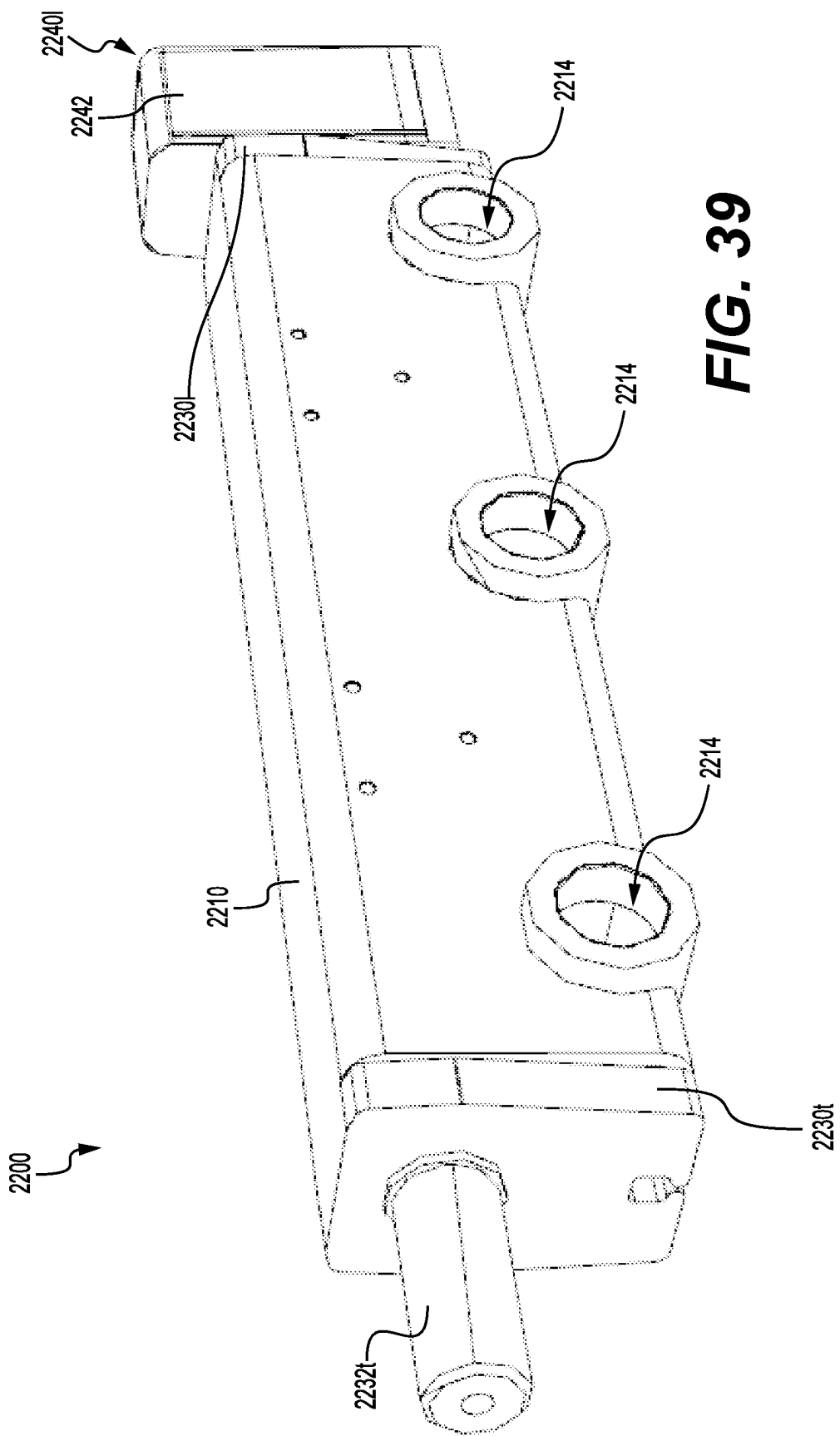
FIG. 39 is a perspective view taken from a top, rear, right side of the suspended undercarriage assembly of FIG. 34, with the trailing bushing assembly removed.

The secondary frame member 2120 defines leading and trailing recesses 21301, 2130t adapted to receive leading and trailing portions of the suspended undercarriage assembly 2200. Referring to FIGS. 34 to 39, the suspended undercarriage assembly 2200 has a beam 2210 that supports the support wheel assemblies 2202 of the track system 2040. Leading and trailing pins 22321, 2232t project longitudinally from the beam 2210 and collectively define the undercarriage pivot axis 2234 (FIG. 37).

In contrast with the track system 40 described above, the bushing assemblies 2240l, 2240t do not have a bushing housing, and the bushings 2242 are received directly in their corresponding recess 21301, 2130t and retained therein using plates 2250 and fasteners 2252. Each plate 2250 resiliently compresses the corresponding bushing 2242 so as to maintain it in pre-stressed condition in order to increase the durability thereof. The bushings 2242 also have a opening 2248 defined therein with characteristics similar to that described above in relation to the suspended undercarriage assembly 200.

Since the suspended undercarriage assembly 2200 has no bushing housings, the manufacturing costs and complexity are reduced compared to the suspended undercarriage assembly 200. The bushings 2242 have the left and right sides tapered between the bottom face and the top face thereof to facilitate removal from the corresponding recess 21301, 2130t when servicing or replacement is desired.

When track system 2040 travels over a laterally slopped terrain, such as a road having a crown, the support wheel assemblies 2202 and the beam 2210 pivot about the undercarriage pivot axis 2234. In other words, the support wheel assemblies 2202 are capable of roll motion relative to the multi-member frame assembly 2100, as shown in FIGS. 36B and 36C. When the support wheel assemblies 2202 and the beam 2210 pivot about the undercarriage pivot axis 2234, the leading pin 2232l and the trailing pin 2232t also pivot about the undercarriage pivot axis 2234 and cause the bushings 2242 of the leading and trailing bushing assemblies 2240l, 2240t to resiliently deform in the lateral directions. In other words, the bushings 2242 are resiliently deformed circumferentially about the undercarriage pivot axis 2234 (FIG. 37). The bushings 2242 are structured to permit movement of the beam 2210 relative to the multi-member frame assembly 2100 in a predetermined range. The bushings 2242 also resiliently bias the beam 2210 towards the rest position (FIG. 36A) with respect to the multi-member frame assembly 2100. In the present embodiment, the support wheel assemblies 2202 and the beam 2210 are capable of roll motion by an angle ranging between about −5 to +5 degrees relative to the multi-member frame assembly 2100. In FIG. 36B, it is shown that the support wheel axis 2220 is moved by angle α between the rest position corresponding to a rotation about the undercarriage pivot axis 2234 of 0 degree and a position 2220' corresponding to a rotation about the undercarriage pivot axis 2234 of 5 degrees in a first direction. In FIG. 36C, it is shown that the support wheel axis 2220 is moved by angle α' between the rest position and a position 2220" corresponding to a rotation about the undercarriage pivot axis 2234 of 5 degrees in a second direction. Other ranges of angle are contemplated in other embodiments.

Furthermore, when the track system 2040 travels over a bump or into a hole, the support wheel assemblies 2202 and the beam 2210 can move vertically, and the leading and trailing pins 2232l, 2232t also move vertically and cause the bushings 2242 of the leading and trailing bushing assemblies 2240l, 2240t to resiliently deform in the vertical direction about the undercarriage pivot axis 2234. In other words, the bushings 2242 are resiliently deformed radially about the undercarriage pivot axis 2234. The vertical displacement of the support wheel assemblies 2202 and the beam 2210 is permitted by the deformation of the bushings 2242 which absorb at least a portion of the impact induced by the bump or hole over which the track system 2040 travels. The bushings 2242 thus provide some damping of the suspended undercarriage assembly 2200 relative to the multi-member frame assembly 2100.

The suspended undercarriage assemblies 200, 1200, 2200 and the track systems 40, 1040, 2040 implemented in accordance with some non-limiting embodiments of the present technology can be represented as presented in the following numbered clauses.

CLAUSE 1: A suspended undercarriage assembly (200, 1200, 2200) connectable to a multi-member frame assembly (110, 1110, 2110) of a track system (40, 1040, 2040), the multi-member frame assembly defining at least one recess (1301, 130t, 11301, 1130t, 21301, 2130t), the suspended undercarriage assembly comprising a beam (210, 1210, 2210) having a leading portion (2121, 12121, 22121) and a trailing portion (212t, 1212t, 2212t), at least one support wheel assembly (202, 1202, 2202) connectable to the beam, at least one of a leading resilient bushing assembly (240l, 1240l, 2240l) connected to the leading portion of the beam, and a trailing resilient bushing assembly (240t, 1240t, 2240t) connected to the trailing portion of the beam, and the at least one of the leading and trailing resilient bushing assemblies being at least partially receivable in the at least one recess for connecting the beam to the multi-member frame assembly, the at least one of the leading and trailing resilient bushing assemblies including a bushing (242, 1242, 2242) defining an opening (248, 1248, 2248) being shaped and dimensioned for promoting deformation of the bushing in at least one of a vertical direction and a lateral direction, the bushing being resiliently deformable to permit movement of the beam relative to the multi-member frame assembly in the vertical direction and in the lateral direction, and to resiliently bias the beam towards a rest position with respect to the multi-member frame assembly.

CLAUSE 2: The suspended undercarriage assembly of clause 1, wherein the at least one of the leading and trailing bushing assemblies has a bushing housing (250) adapted for connection to the multi-member frame assembly, the bushing being received at least partially within the bushing housing.

CLAUSE 3: The suspended undercarriage assembly of clause 2, wherein the at least one recess defines a first profile, and the bushing housing defines a second profile being complementary to the first profile, the second profile of the bushing housing being adapted for slidably engaging and retaining the bushing housing in the at least one recess.

CLAUSE 4: The suspended undercarriage assembly of any one of clauses 1 to 3, wherein the beam has a leading pin projecting from the leading portion of the beam, the beam has a trailing pin projecting from the trailing portion of the beam, the at least one of the leading resilient bushing assembly and the trailing bushing assembly includes the leading resilient bushing assembly and the trailing bushing assembly, the leading resilient bushing assembly defines a leading aperture (244, 1244l, 2244l) sized and dimensioned for receiving the leading pin and for connecting the beam to the leading resilient bushing assembly, and the trailing resilient bushing assembly defines a trailing aperture (244, 1244t, 2244t) sized and dimensioned for receiving the trailing pin and for connecting the beam to the trailing resilient bushing assembly.

CLAUSE 5: The suspended undercarriage assembly of clause 4, wherein, in the bushing of the leading resilient bushing assembly, the opening is defined below the leading aperture, and in the bushing of the trailing resilient bushing assembly, the opening is defined below the trailing aperture.

CLAUSE 6: The suspended undercarriage assembly of clause 4 or 5, wherein, in the bushing of the leading resilient bushing assembly, the opening has a width (248b) that is about equal to a diameter of the leading aperture, and in the bushing of the trailing resilient bushing assembly, the opening has a width (248b) that is about equal to a diameter of the trailing aperture.

CLAUSE 7: The suspended undercarriage assembly of any one of clauses 4 to 6, wherein, in the leading and trailing bushing assemblies, the opening is shaped as a rectangle with rounded corners (248a).

CLAUSE 8: The suspended undercarriage assembly of any one of clauses 1 to 7, wherein the at least one support wheel assembly is pivotable with respect to the multi-member frame assembly by an angle (a, a') ranging between about −5 to +5 degrees with respect to the rest position.

CLAUSE 9: A track system (40, 1040, 2040) for a vehicle (60) having a chassis (62), the track system comprising a multi-member frame assembly (110, 1110, 2110) connectable to the chassis of the vehicle, the multi-member frame assembly defining at least one recess (1301, 130*t*, 11301, 1130*t*, 21301, 2130*t*), a leading idler wheel assembly (1601, 11601, 21601) at least indirectly connected to the multi-member frame assembly, a trailing idler wheel assembly (160*t*, 1160*t*, 2160*t*) at least indirectly connected to the multi-member frame assembly, a suspended undercarriage assembly (200, 1200, 2200) including a beam (210, 1210, 2210) having a leading portion (2121, 12121, 22121) and a trailing portion (212*t*, 1212*t*, 2212*t*), at least one support wheel assembly (202, 1202, 2202) connected to the beam, at least one of a leading resilient bushing assembly (240*l*, 1240*l*, 2240*l*) connected to the leading portion of the beam, and a trailing resilient bushing assembly (240*t*, 1240*t*, 2240*t*) connected to the trailing portion of the beam, and the at least one of the leading and trailing resilient bushing assemblies including a bushing (242, 1242, 2242) defining an opening (248, 1248, 2248) being shaped and dimensioned for promoting deformation of the bushing in at least one of a vertical direction and a lateral direction, the bushing being resiliently deformable to permit movement of the beam relative to the multi-member frame assembly in the vertical direction and in the lateral direction, and to resiliently bias the beam towards a rest position with respect to the multi-member frame assembly, and an endless track (180, 1180) wrapped around the multi-member frame assembly, the leading and trailing idler wheel assemblies, and the suspended undercarriage assembly.

CLAUSE 10: The track system of clause 9, wherein the multi-member frame assembly includes a primary frame member (110, 1110, 2110) at least indirectly connectable to the chassis of the vehicle, and at least one secondary frame member (120, 1120, 2120) connected to the primary frame member, the at least one secondary frame member defining the at least one recess.

CLAUSE 11: The track system of clause 10, wherein the chassis of the vehicle has a pivot pin (64) extending laterally outwardly, and the primary frame member is pivotably connectable to the chassis of the vehicle via the pivot pin.

CLAUSE 12: The track system of clause 11, wherein the pivot pin defines a pivot axis (65), the at least one support wheel assembly includes a first, a second and a third support wheel assembly defining first, second and third support wheel axes (220, 1220, 2220), and the pivot axis is longitudinally offset from any one of the first, second and third support wheel axes when the track system is at the rest position.

CLAUSE 13: The track system of any one of clauses 10 to 12, wherein the at least one secondary frame member is selectively pivotable relative to the primary frame member about a vertically extending pivot axis (126, 2114*a*) to vary a yaw angle of the track system relative to the chassis of the vehicle.

CLAUSE 14: The track system of clause 13, wherein the primary frame member has a cylindrical projection (2114) inserted in an aperture (2121) defined in the secondary frame member.

CLAUSE 15: A suspended undercarriage assembly (1200) connectable to a multi-member frame assembly (1100) of a track system (1040), the multi-member frame assembly defining at least one recess (11301, 1130*t*), the suspended undercarriage assembly comprising a beam (1210) having a leading portion (12121) and a trailing portion (1212*t*), the beam further comprising a leading pin (12321) projecting from the leading portion of the beam and a trailing pin (1232*t*) projecting from the trailing portion of the beam, at least one support wheel assembly (1202) connectable to the beam, at least one of a leading resilient bushing assembly (1240*l*) connected to the leading portion of the beam, and a trailing resilient bushing assembly (1240*t*) connected to the trailing portion of the beam; and the at least one of the leading and trailing resilient bushing assemblies including a rectangular housing (1250), and four bushings (1242) seated in the corners of the rectangular housing and being propped against the rectangular housing by the corresponding leading and trailing pin.

CLAUSE 16: The suspended undercarriage assembly of clause 15, further comprising at least one resilient pad (1270) connected to the beam and configured to abut the multi-member frame assembly.

CLAUSE 17: The suspended undercarriage assembly of clause 15 or 16, wherein the four bushings define four openings (1248), each one of the openings extending between adjacent bushings and being shaped and dimensioned for promoting deformation of the corresponding bushing assembly in at least one of a vertical direction and a lateral direction.

CLAUSE 18: The suspended undercarriage assembly of any one of clauses 15 to 17, wherein the leading pin and the trailing pin have a diamond-shaped cross-section.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A suspended undercarriage assembly connectable to a multi-member frame assembly of a track system, the multi-member frame assembly defining at least one recess, the suspended undercarriage assembly comprising:
   a beam having a leading portion and a trailing portion; a leading pin projecting from the leading portion and a trailing pin projecting from the trailing portion;
   at least one support wheel assembly connectable to the beam;
   at least one of:
      a leading resilient bushing assembly connected to the leading portion of the beam, the leading resilient bushing assembly defining a leading aperture sized and dimensioned for receiving the leading pin for connecting the beam to the leading resilient bushing assembly; and
      a trailing resilient bushing assembly connected to the trailing portion of the beam, the trailing resilient bushing assembly defining a trailing aperture sized and dimensioned for receiving the trailing pin for connecting the beam to the trailing resilient bushing assembly; and
   the at least one of the leading and trailing resilient bushing assemblies being at least partially receivable in the at least one recess for connecting the beam to the multi-member frame assembly, the at least one of the leading and trailing resilient bushing assemblies including a bushing having an opening defined therein and being shaped and dimensioned for promoting deformation of the bushing in at least one of a vertical direction and a lateral direction, the bushing being resiliently deformable to permit movement of the beam relative to the multi-member frame assembly in the vertical direction and in the lateral direction, and to resiliently bias the beam towards a rest position with respect to the multi member frame assembly.

2. The suspended undercarriage assembly of claim 1, wherein the at least one of the leading and trailing bushing assemblies has a bushing housing adapted for connection to the multi-member frame assembly, the bushing being received at least partially within the bushing housing.

3. The suspended undercarriage assembly of claim 2, wherein the at least one recess defines a first profile, and the bushing housing defines a second profile being complementary to the first profile, the second profile of the bushing housing being adapted for slidably engaging and retaining the bushing housing in the at least one recess.

4. The suspended undercarriage assembly of claim 1, wherein, in the bushing of the leading resilient bushing assembly, the opening is defined below the leading aperture, and in the bushing of the trailing resilient bushing assembly, the opening is defined below the trailing aperture.

5. The suspended undercarriage assembly of claim 1, wherein, in the bushing of the leading resilient bushing assembly, the opening has a width that is about equal to a diameter of the leading aperture, and in the bushing of the trailing resilient bushing assembly, the opening has a width that is about equal to a diameter of the trailing aperture.

6. The suspended undercarriage assembly of claim 1, wherein, in the leading and trailing bushing assemblies, the opening is shaped as a rectangle with rounded corners.

7. The suspended undercarriage assembly of claim 1, wherein the at least one support wheel assembly is pivotable with respect to the multi-member frame assembly by an angle ranging between −5 to 5 degrees with respect to the rest position.

8. A track system for a vehicle having a chassis, the track system comprising:
    a multi-member frame assembly connectable to the chassis of the vehicle, the multi-member frame assembly defining at least one recess;
    a leading idler wheel assembly at least indirectly connected to the multi member frame assembly;
    a trailing idler wheel assembly at least indirectly connected to the multi member frame assembly;
    a suspended undercarriage assembly including:
    a beam having a leading portion and a trailing portion with a leading pin projecting from the leading portion and a trailing pin projecting from the trailing portion;
    at least one support wheel assembly connected to the beam;
    at least one of:
        a leading resilient bushing assembly connected to the leading portion of the beam, the leading resilient bushing assembly defining a leading aperture sized and dimensioned for receiving the leading pin for connecting the beam to the leading resilient bushing assembly; and
        a trailing resilient bushing assembly connected to the trailing portion of the beam, the trailing resilient bushing assembly defining a trailing aperture sized and dimensioned for receiving the trailing pin for connecting the beam to the trailing resilient bushing assembly; and
    the at least one of the leading and trailing resilient bushing assemblies being at least partially received in the at least one recess and connecting the beam to the multi-member frame assembly, the at least one of the leading and trailing resilient bushing assemblies including a bushing having an opening defined therein and being shaped and dimensioned for promoting deformation of the bushing in at least one of a vertical direction and a lateral direction, the bushing being resiliently deformable to permit movement of the beam relative to the multi-member frame assembly in the vertical direction and in the lateral direction, and to resiliently bias the beam towards a rest position with respect to the multi-member frame assembly; and
    an endless track wrapped around the multi-member frame assembly, the leading and trailing idler wheel assemblies, and the suspended undercarriage assembly.

9. The track system of claim 8, wherein the multi-member frame assembly includes a primary frame member at least indirectly connectable to the chassis of the vehicle, and at least one secondary frame member connected to the primary frame member, the at least one secondary frame member defining the at least one recess.

10. The track system of claim 9, wherein:
    the chassis of the vehicle has a pivot pin extending laterally outwardly, and
    the primary frame member is pivotably connectable to the chassis of the vehicle via the pivot pin.

11. The track system of claim 10, wherein:
    the pivot pin defines a pivot axis;
    the at least one support wheel assembly includes a first, a second and a third support wheel assembly defining first, second and third support wheel axes; and
    the pivot axis is longitudinally offset from any one of the first, second and third support wheel axes when the track system is at the rest position.

12. The track system of claim 9, wherein the at least one secondary frame member is selectively pivotable relative to the primary frame member about a vertically extending pivot axis to vary a yaw angle of the track system relative to the chassis of the vehicle.

13. The track system of claim 12, wherein the primary frame member has a cylindrical projection inserted in an aperture defined in the secondary frame member.

* * * * *